United States Patent [19]
Hiroki et al.

[11] Patent Number: 5,767,924
[45] Date of Patent: Jun. 16, 1998

[54] DISPLAY UNIT WHICH IS IMMERSED IN A COOLANT

[75] Inventors: Masaaki Hiroki; Jun Koyama; Toshimitsu Konuma, all of Kanagawa; Shunpei Yamazaki, Tokyo, all of Japan

[73] Assignee: Semiconductor Energy Laboratory Co., Kanagawa-ken, Japan

[21] Appl. No.: 660,108

[22] Filed: Jun. 7, 1996

[30] Foreign Application Priority Data

| Jun. 9, 1995 | [JP] | Japan | 7-168158 |
| Jun. 9, 1995 | [JP] | Japan | 7-168159 |
| Jun. 15, 1995 | [JP] | Japan | 7-172811 |
| Jun. 19, 1995 | [JP] | Japan | 7-176738 |

[51] Int. Cl.⁶ .................. G02F 1/1335; G02F 1/133; G02F 1/1333; G04N 5/74
[52] U.S. Cl. ............ 349/5; 349/8; 349/73; 349/161; 348/749; 348/751; 348/757; 353/54
[58] Field of Search ............ 345/1, 32, 88, 345/205, 206; 348/748, 749, 750, 751, 756, 757; 353/31, 34, 48, 49, 52, 54; 349/73, 161, 5, 8

[56] References Cited

U.S. PATENT DOCUMENTS

| 4,150,396 | 4/1979 | Hareng et al. | 348/751 |
| 5,097,323 | 3/1992 | Sato et al. | 349/8 |
| 5,264,879 | 11/1993 | Shikama | 349/8 |

FOREIGN PATENT DOCUMENTS

| 60-003291 | 1/1985 | Japan . | |
| 63-240525 | 10/1988 | Japan | 345/32 |
| 2-210325 | 8/1990 | Japan | 349/161 |
| 3-146943 | 6/1991 | Japan | 349/8 |

*Primary Examiner*—William L. Sikes
*Assistant Examiner*—Walter Malinowski
*Attorney, Agent, or Firm*—Fish & Richardson P.C.

[57] ABSTRACT

A display unit includes an optical modulation element for subjecting an incident light beam to optical modulation, and a coolant disposed in contact with an output side of the optical modulation element, wherein a focal distance of an output light beam of the optical modulation element is set to a predetermined distance in accordance with a length of the output light beam of the optical modulation element, which passes through the coolant.

65 Claims, 25 Drawing Sheets

PIXEL SECTION
634

DISPLAY UNIT WHICH IS IMMERSED IN A COOLANT

BACKGROUND OF THE INVENTION

1. Field of the Invention

The present invention relates to a display unit of the type that projects an image.

2. Description of the Related Art

There has been known a display unit of the type that projects an image on a screen using a liquid-crystal display panel. A technique which is disclosed in Japanese Patent Unexamined Publication No. Sho 60-3291 has been known as such a projection type display unit. FIG. 22 shows a schematic diagram of a conventional projection type display unit.

What is shown in FIG. 22 is a structure in which the respective images corresponding to RGB are synthesized to project and display a color image on a screen (or a proper face to be projected). In FIG. 22, reference numeral 1 denotes a light beam for displaying a color image of R (red), which is irradiated onto a liquid-crystal panel 7 after penetrating a color filter 4. The liquid-crystal panel 7 is so designed as to modulate the light beam 1 into a proper light to form an image corresponding to R. In a semi-transparent mirror 13, images corresponding to G and B which have been reflected by a total reflection mirror 12 are synthesized with the image corresponding to R which has been light-modulated by the liquid-crystal panel 7. Then, an image (color image) obtained by synthesizing the images of RGB is projected onto a screen 15 through a projection lens 14.

The general liquid-crystal panel 7 (similarly 8 and 9) is so structured that a pair of glass substrates are disposed between a pair of polarizing plates which are arranged at a different angle of 90°, and a TN type liquid crystal is interposed and held between the pair of glass substrates.

Reference numeral 2 denotes a light beam for displaying an image of G (green), which passes through a liquid-crystal panel 8 after passing through a color filter 5, to thereby be subjected to a predetermined light modulation. With this light modulation, the image corresponding to G is formed. The image of G formed through the light modulation by the liquid-crystal panel 8 passes through a semi-transparent mirror 11. In the semi-transparent mirror 11, the image of B reflected by a total reflection mirror 10 is synthesized with the image of G.

Reference numeral 3 denotes a light beam for displaying an image of B (blue), which passes through a liquid-crystal panel 9 after penetrating a color filter 6, to thereby be subject to a predetermined light modulation. The image of B which has been subjected to the light modulation by the liquid-crystal panel 9 is reflected by the total reflection mirror 10, and then synthesized with the image of G by the semi-transparent mirror 11.

The display unit that operates on the basis of the above-mentioned principle is required to satisfy the items stated below.

1) The overall structure is downsized as much as possible.
2) The structural elements are reduced in number (The structure is simplified.).
3) The structure is so designed as to restrain the rising of temperature.
4) The projection lenses are so designed that the respective optical axes of RGB images readily coincide with each other.
5) The structure is so designed that the lengths of optical paths extending from the respective liquid-crystal panels for RGB to the corresponding projection lens coincide with each other.

The above-mentioned items 1) and 2) are required when requirements such as an improved handling, reduced costs, and lowered failure ratio are pursued. These required items are important from the viewpoint of making the display units as goods.

The above-mentioned item 3) leads to a serious problem when the intensity of light emission of a light source is increased in order to obtain a required luminance.

The projection type display unit is required from its structural viewpoint that light passes through the respective filters, the liquid-crystal panels, as well as optical elements such as the semi-transparent mirrors several times until an image is finally displayed, as shown in FIG. 22. For that reason, there arises such a principle problem that a displayed image becomes dark.

In order to solve that problem, there is required the use of a lamp (bright light source) high in the intensity of light emission. However, the lamp high in the intensity of light emission heats a portion onto which the light is irradiated, to thereby make a temperature within the unit rise.

As is well known, a liquid-crystal material is liable to change its physical property with the rising of temperature. In other words, the rising of temperature causes the response speed of liquid crystal to change, resulting in a change in optical modulation capacity. Consequently, display becomes unclear.

Also, the rising of temperature leads to such problems that the optical characteristics of the optical unit such as a lens or a mirror to be changed, or that the optical axes are shifted.

In order to solve the above-mentioned problems, an appropriate cooler means needs to be disposed so that the interior of the unit is kept a permissible temperature or lower. The cooling means is generally a cooling fan which is designed to forcedly cool the interior of the unit.

In this case, a certain space needs to be defined in the interior of the unit for enhancing a cooling effect so that air flows therein. However, this structure is contrary to the above-mentioned required items 1) and 2). Also, any noise from the cooling fan leads to a serious problem. Further, there arises such a problem that dust may attach onto the surface of a liquid-crystal panel or the surface of an optical system by conducting the forcedly cooling using the cooling fan.

In the case where a high-quality image is to be displayed, the above-mentioned required items 4) and 5) become important. However, in case of applying the structure shown in FIG. 3, it becomes difficult to satisfy the required item particularly indicated by 5). In other words, because a spacial distance between each liquid-crystal panel and the projection lens 14 differs from each other, the focal point of each image which has been subjected to the optical modulation by the liquid-crystal panel does not coincide with each other on the projection lens 14.

The structure shown in FIG. 22 is characterized in that, with a change in the focal distance of the projection lens 14, an image can be displayed even though a distance to the projection surface is changed. Also, the structure is characterized in that the image can be set to an arbitrary size by changing the distance to the projection surface.

However, in the case where the focus of each image of RGB on the projection lens 14 does not coincide with each other, color shifts may occur or unclear images may be produced by moving the projection lens 14.

3

As a method for solving the problem relating to the inconsistency of the focal positions of images on the projection lens 14 from the respective liquid-crystal panels 7 to 9, there is a method in which the positions of the respective liquid-crystal panels 7 to 9 for RGB are made slightly different so that the focal points coincide with each other. However, the arrangement of the respective liquid-crystal panels 7 to 9 for RGB at different positions is contrary to the required item 2) that the structural elements should be reduced in number, because the structure becomes complicated. Also, it is contrary to the required item 1) because the entire structure is increased in size. Further, it is contrary to the required item 4) because it is difficult to make the respective optical axes coincide with each other.

As a method for solving the problem relating to the inconsistency of the focal positions of images on the projection lens 14 from the respective liquid-crystal panels 7 to 9, there is a method of correcting the length of the optical path using an optical system where a variety of lenses are combined. However, such a structure has the optical system complicated, which does not satisfy the required items 1) and 2). Also, the method does not satisfy the required item 4) because it is difficult to make the optical axes coincide with each other.

As described above, it is difficult to satisfy all of the above-mentioned plural required items. Hence, for example, in the present status, a unit that obtains an image having a high luminance (bright screen) is large in the entire unit and high in the costs. This is a result of giving up the required items 1) and 2) but satisfies other required items.

SUMMARY OF THE INVENTION

The present invention has been made in view of the above, and therefore an object of the present invention is to provide a projection type display unit that satisfies the required items, 1) to downsize the entire structure as much as possible, 2) to reduce the structural elements (to simplify the structure), 3) to restrain the rising of temperature, 4) to readily make the respective optical axes of images of RGB coincide with each other on the projection lens, and 5) to make the lengths of optical paths extending from the respective liquid-crystal panels for RGB to the projection lens uniform.

At present, a linear sequential scanning circuit using a shift register is mainly used as a drive circuit for a display unit such as an active matrix liquid-crystal display unit.

A tone signal for giving tone indication is classified into two of the digital system and the analog system. In any system, an input signal is inputted to n-stage shift registers connected in series (n is the number of pixels in a horizontal direction or a perpendicular direction) so that the signal is delayed or transmitted to conduct the linear sequential scanning operation.

A first stage of the shift registers is connected with a sample/hold circuit and a signal amplifier circuit, and a signal is transmitted to a pixel section through those circuits via a signal line.

FIG. 23 shows a schematic diagram of the entire liquid-crystal display unit.

A signal line drive circuit 21 and a scanning line drive circuit 22 are disposed on the same glass substrate, and a liquid-crystal pixel section 23 is disposed on the central portion of the display unit. The liquid-crystal pixel section 23 is connected with the signal line drive circuit 21 through signal lines 24 disposed in parallel to a columnar direction (X1, X2, . . . ) and connected with the scanning line drive

4 circuit 22 through signal lines 25 disposed in parallel to a row direction of (Y1, Y2, . . . ). Thin-film transistors not shown (hereinafter referred to as "TFT") are disposed in the form of a matrix as switching elements at the respective cross points of the signal lines 24 and the scanning lines 25. Each TFT has a source connected to the signal line 24, a gate connected to the scanning line 25 and a drain connected to a pixel electrode not shown. The pixel electrode faces with an opposing electrode with liquid crystal therebetween.

In synchronism with the signal lines 24 which is linearly sequenced by the signal line drive circuit 21, a signal is sent to the scanning lines 25 by the scanning line drive circuit 22, thereby providing a necessary signal for image display.

FIG. 2B shows a linear sequential drive circuit of the analog system as one example of the signal line drive circuit 21. In this example, the scanning line drive circuit 22 is denoted by reference numeral 31, and the scanning line drive circuit 22 is comprised of a shift register and other circuits.

As shown in FIG. 24, in the signal line drive circuit 21, a shift register circuit 30 is connected to supply voltage vdd 32 and Vss 33, and receives a clock pulse (CP) 34 and a start pulse (SP) 35 as an input signal. The shift register circuit 30 is comprised of n- flip flop (F.F.) circuits connected in series, and so on. The start pulses 35 inputted to the shift register circuit 30 are sequentially delayed and transmitted to the flip flop circuits connected in series within the shift register circuit 30.

The output signals of the n- flip flop (F.F.) circuits in the shift register circuit 30 are indicated by Q0, Q1, . . . Qn, and with those signals Q0, Q1, . . . Qn as timing signals, in a sampling circuit using an analog switch 37, analog tone data from a video signal line 36 is sampled. The analog tone data thus sampled is stored in an analog memory 38 which is comprised of a sample/hold circuit once before being supplied to the pixel section.

In accordance with a scanning timing of a latch pulse 39 inputted from the external, the tone data stored in the analog memory 38, after being converted into impedance by an analog buffer 40, is transmitted to a pixel section TFT 42 through a signal line 41, thereby being displayed on a pixel cell 44.

Through the respective shift registers, tone date is inputted to the pixel cell 44 through the above-mentioned path, to thereby conduct the linear sequential scanning of an image.

The above-mentioned example is an example of the linear sequential scanning drive circuit of the analog system, and as the sample/hold circuit, an analog memory (capacitor) is used in the analog system whereas a latch circuit is used in the digital system, for holding a signal therein.

In any cases, the linear sequential scanning operation using the shift registers are conducted without any change, and the fault of one circuit causes a signal not to be transmitted to the shift registers located after the one circuit, whereby a good display state is not obtained and the yield on the display unit is lowered without any change.

To improve this drawback, there is considered a decoder type drive circuit in which the shift register section is replaced by a decoder circuit so that a display pixel section is directly selected in accordance with an address signal.

FIG. 25 shows a decoder type drive circuit of the digital system.

In the figure, an address signal for a pixel to be displayed is inputted to an address decoder 51 from an external terminal, and then converted into a binary digital signal.

The address signal is changed into a latch pulse 53 of latch circuits 52 connected in parallel by the number identical to that of bits of an image signal. Each of the latch circuits 52 is comprised of a delay type flip flop circuit.

A data signal 54 for selecting a tone is inputted to those latch circuits 52 through data signal lines different from each other. In the latch circuits 52, in accordance with a timing of the latch pulse 53 outputted from the address decoder 51, a data signal 54 is selected as the tone of image data to be displayed and then stored as a logic.

The data signal 54 selected by the latch circuit 52 is inputted to subsequent latch circuits 55 connected in series to the latch circuits 52, correspondingly. In the latch circuits 55, in accordance with a latch pulse 56 inputted from the external, a signal is outputted in synchronism with one scanning timing of the display unit and then inputted to a decoder 57 in a state where the tone of image data to be displayed is selected.

The output signal from the decoder 57 is inputted to a gate of each of analog switches 59. The analog switches 59 are connected with tone signals 58 which have been prepared by dividing potentials corresponding to tones by resistors in advance. In the analog switches 59, a pixel to be displayed and its tone are selected in accordance with a signal from the decoder 57. The output signal of the analog switches 59 is transmitted to a pixel section necessary for display through signal lines 60 as digital display data and then displayed.

In this decoder type drive circuit, the failure of one circuit does not adversely affect other circuits, thereby being capable of obtaining an excellent display state with a remarkable improvement in the yield on the display unit.

Also, because of the display drive circuit using random access, power consumption can be lowered with the expectation of lowered costs.

However, in this decoder type drive circuit, as the number of bits increases, the number of input terminals increases more. The input terminals are connected with the address signal lines from the external. The input terminals occupy a large area on a substrate for the connection with the address signal lines. For that reason, the increased number of address terminals causes an area where the input terminals are provided to be increased, which leads to such a new problem that the display unit is prevented from being downsized.

Also, because of an increased number of wires, the adjacent wires produce voltage at random. This may cause a problem as to crosstalk.

Further, the address decoder 51 shown in FIG. 25 is connected with a counter circuit. The counter circuit counts clock pulses, and a count result is inputted to the address decoder 51 as an address signal.

The counter circuit is roughly classified into an asynchronous counter and a synchronous counter. FIG. 26 shows a block diagram of the asynchronous counter.

The asynchronous counter has n- JK type flip flop circuits 62 connected in series correspondingly to the number of bits necessary for counting the signal lines or the scanning lines, which receive a clock pulse CP 61 as an input signal. For example, in the case where the number of pixels in a horizontal direction is 500, that is, the number of signal lines is 500, 9 bits are required for input of the signal line drive circuit. FIG. 16 is a diagram showing the respective waveforms of output signals Q0, Q1 and Q2 as well as the clock pulse (CP) 61.

An input signal of the second or subsequent JK type flip flop circuit 62 is an output signal of the JK type flip flop circuit at its prestage. In order to count the clock pulse (CP) 61 inputted, there is required that a first JK type flip flop circuit 62 has the output signal Q0 inverted every time it receives a clock pulse 61, and a second JK type flip flop circuit 62 has the output signal Q0 inverted every time it receives two clock pulses 61 but held as it is in other states. For that reason, the first JK type flip flop circuit 62 holds a high signal received from both J- and K- input terminals, respectively, so that the first JK type flip flop circuit 62 has the output signal inverted every time it receives a clock pulse. Similarly, the second and subsequent JK type flip flop circuits 62 hold a high signal received from both J- and K-input terminals so that its output signal rises at a timing when the input signal changes from High (hereinafter referred to as "H") to Low (hereinafter referred to as "L").

However, because the asynchronous counter makes the second and subsequent counts depend on an output signal from the prestage, a transmission delay time is accumulated, thereby making high-speed operation difficult. Also, the accumulation of this signal delay causes a hazard. Thus, the asynchronous counter is improper for a high clock frequency.

Furthermore, up to now, there has been known a structure in which two drive circuits are provided in order to change a direction of selecting the signal lines or the scanning lines. FIGS. 27(A) and 27(B) show a front view of a liquid-crystal display unit having two scanning line drive circuits. In FIGS. 27(A) and 27(B), reference numeral 71 denotes a substrate; 72, a pixel section; 73, a signal line drive circuit; and 74 and 75, scanning line drivers. As shown in FIGS. 27(A) and 27(B), the unit is enlarged in order to increase the number of drive circuits.

Another object of the present invention is to eliminate the above-mentioned problems, thereby obtaining a good display state and improving the yield by applying a linear sequential drive circuit that does not depend on shift registers.

Still another object of the present invention is to provide a display unit that enables scanning operation bidirectionally without increasing the unit in size.

Yet still another object of the present invention is to provide an address decoder type drive circuit that remarkably reduces the number of terminals, facilitates the downsizing of the display unit, and deletes input signal lines in order to eliminate crosstalk, and also which enables high-speed operation by applying a synchronous counter.

In order to solve the above-mentioned problems, according to one aspect of the present invention, there is provided a display unit, comprising:

an optical modulation element for subjecting an incident light beam to optical modulation; and a coolant disposed in contact with an output side of said optical modulation element;

characterized in that a focal distance of an output light beam of said optical modulation element is set to a predetermined distance in accordance with a length of the output light beam of said optical modulation element, which passes through said coolant.

A specific example of the above-mentioned structure is shown in FIG. 1. In FIG. 1, three liquid-crystal panels 113 to 115 for RGB (liquid-crystal electro-optical unit) are shown as an optical modulation element that optically modulates an incident light beam. Those three liquid-crystal panels are integrated together using a pair of glass substrates 107 and 109, which contributes to the simplification of the entire structure. In other words, three liquid-crystal panels 113 to 115 corresponding to RGB are integrated within apparently one liquid-crystal panel.

In FIG. 1, there are shown three liquid-crystal panels 113 to 115 for RGB, but multiple panels more than three may be disposed. Also, not only the respective images for RGB are synthesized but also the same image may be formed by a plurality of liquid-crystal panels. In this case, the luminance of an image can be made high by superimposing a plurality of images. Also, in the case where a liquid-crystal panel is defective, such a defect can be prevented from being remarkable. Further, instead of the type in which color images are synthesized, a plurality of identical or different images may be superimposed or synthesized.

In the structure shown in FIG. 1, a coolant for the respective liquid-crystal panels exists in a region indicated by reference numeral 121. The coolant is in contact with the output side (a surface from which an image that passes through the panel is outputted) of the respective liquid-crystal panels 113 to 115 that form optical modulation elements. In the structure shown in FIG. 1, the entire liquid-crystal panels are in contact with coolant so that the entire liquid-crystal panels are cooled. The coolant may be a fluorine inactive liquid. For example, a liquid which is usually called "fluonate" may be used. Alternatively, a certain kind of oil, for example, a cedar oil or the like may be used.

Moreover, in the structure shown in FIG. 1, an image coming out of the liquid-crystal panel 113 passes through a liquid existing in the region 121 with the shortest distance, an image coming out of the liquid-crystal panel 114 passes through the liquid existing in the region 121 with the longer distance subsequent to the above distance, and an image coming out of the liquid-crystal panel 115 passes through the liquid existing in the region 121 with the longest distance.

With such a structure, the focal distance of the image coming out of the liquid-crystal panel 115 is shortened, and the image coming out of the liquid-crystal panel 114 is next shortened. The focal positions of the respective images for RGB, which pass through a projection lens 119 can be identical or substantially identical to each other.

In other words, the focal distance of an output light beam of each liquid-crystal panel is set (adjusted) to a predetermined distance in accordance with a length of the output light beam of the liquid-crystal panel, which passes through the liquid, so that the focal positions of output light beams (images) from the respective panels are finally identical to each other.

According to another structure of the present invention, there is provided a display unit, comprising:

means for generating a plurality of incident light beams divided into predetermined wavelength regions;

at least one optical modulation element disposed in correspondence with each of said plurality of incident light beams; and a coolant being in contact with said optical modulation element;

characterized in that a light coming out of said optical modulation element passes through said coolant with a different length, respectively.

A specific example of the above-mentioned structure is shown in FIG. 1. In the structure shown in FIG. 1, dichroic mirrors 103, 104 and 105 are provided as means for generating a plurality of incident light beams corresponding to predetermined wavelength regions. In FIG. 1, there are shown the dichroic mirrors, instead of which a light beam having a required wavelength region may be obtained using a variety of optical filters such as color filters. A lamp or light emission means that generates a light beam having a required wavelength region. A plurality of light beams having a required wavelength region may be different in wavelength region or overlapped in a part or all of the wavelength regions.

Also, in the structure shown in FIG. 1, optical modulation elements (liquid-crystal panels) 113 to 115 are disposed in correspondence with a plurality of incident light beams of RGB. In FIG. 1, one liquid-crystal panel indicated by reference numeral 111 is disposed for a light beam of R. Alternatively, a plurality of liquid-crystal panels are disposed for the light beam of R so that light beams (optically modulated images) that have passed through those liquid-crystal panels are superimposed on each other. In this case, since two liquid-crystal panels are provided for each of RGB, six liquid-crystal panels are required in total.

In the structure shown in FIG. 1, a coolant for cooling liquid-crystal panels 113 to 115 that form optical modulation elements exist in the region indicated by reference numeral 121. A distance by which each image passes through the coolant is different depending on an image from each liquid-crystal panel.

In other words, in the structure shown in FIG. 1, a distance of from the liquid-crystal panel 115 to the projection lens 119 is longer than a distance of from the liquid-crystal panel 114 to the projection lens 119. Also, the distance of from the liquid-crystal panel 114 to the projection lens 119 is longer than a distance of from the liquid-crystal panel 113 to the projection lens 119. This structure is so arranged that the image from the liquid-crystal panel 115 passes through the liquid existing in the region 121 with the first longest distance. The image from the liquid-crystal panel 114 passes through the liquid existing in the region 121 with the second longest distance. The image from the liquid-crystal panel 113 passes through the liquid existing in the region 121 with the shortest distance.

According to another structure of the present invention, there is provided a display unit, comprising:

a plurality of optical modulation elements disposed in correspondence with a plurality of incident light beams, respectively; and a coolant being in contact with said optical modulation elements;

characterized in that light beams coming out of said optical modulation elements pass through said coolant with different length, respectively, and the focal positions of images modulated by said plurality of optical modulation elements are identical or substantially identical to each other.

A specific example of the above-mentioned structure is shown in FIG. 1. In the structure shown in FIG. 1, light beams (images) coming out of the respective liquid-crystal panels 113 to 115 that form optical modulation elements are allowed to pass through the coolant existing in the region 121 with different lengths, respectively, so that the focal positions of the respective images for RGB, which pass through the projection lens 119 are made identical to each other.

It is needless to say that the plurality of incident light beams in the above-mentioned structure is not limited to or by the combination of light beams of RGB.

According to still another structure of the present invention, there is provided a display unit, comprising:

means for generating incident light beams divided into three wavelength regions of RGB;

at least three optical modulation elements disposed in correspondence with the incident light beams of RGB;

a coolant being in contact with said three optical modulation elements; and means for converging and projecting the light beams coming out of said three optical modulation elements;

characterized in that the light beams coming out of said three optical modulation elements pass through said coolant with different lengths, respectively, and the focal positions of the respective images optically modulated by said three optical modulation elements are made identical or substantially identical to each other on said projecting means.

A specific example of the above-mentioned structure is shown in FIG. 1. The structure shown in FIG. 1 includes means 103, 104 and 105 for generating incident light beams divided into three wavelength regions of RGB, at least three optical modulation elements (liquid-crystal panels) disposed in correspondence with the incident light beams of RGB, a coolant being in contact with said three optical modulation elements existing in the region 121, and means 116, 117, 118 and 119 for converging and projecting the light beams coming out of said three optical modulation elements 113 to 115, with the structure in which the light beams coming out of said three optical modulation elements pass through the coolant existing in the region 121 with different lengths, respectively.

With the structure in which the light beams coming out of the three optical modulation elements 113 to 115 pass through the coolant existing in the region 121 with different lengths, the focal positions of the respective images optically modulated by said three optical modulation elements are made identical or substantially identical to each other on the projecting means 119.

According to yet still another structure of the present invention, there is provided a display unit, comprising:

a plurality of liquid-crystal electro-optical units integrated together using the same translucent substrate; and a coolant being in contact with said plurality of liquid-crystal electro-optical units;

characterized in that in at least two of said plurality of liquid-crystal electro-optical units, light beams that penetrates those two liquid-crystal electro-optical units pass though said coolant with different lengths.

With the above-mentioned structure, the light beams that have penetrated the at least two liquid-crystal electro-optical units are identical or substantially identical to each other at a predetermined location.

In the above-mentioned structure, the plurality of optical modulation elements are integrated together using the same translucent substrate, thereby realizing the simplification of the entire structure of the unit. A specific example of this structure is shown in FIG. 1. In the structure shown in FIG. 1, the liquid-crystal panels indicated by reference numerals 113 to 115 are integrated together using a pair of glass substrates 106 and 107. With such a structure, the entire structure can be simplified.

In the present invention, in the structure where images from a plurality of optical modulation elements are synthesized, because the images from the respective optical modulation elements are allowed to pass through the coolant for cooling the respective optical modulation elements with different distances, respectively, the images from the different optical modulation elements can be formed on the same plane. As a result, for example, in the case where the present invention is applied to a three-plate projection type display unit, the images divided into RGB can be synthesized without any shifts, thereby being capable of projecting a clear color image.

Also, with the structure where the optical modulation elements are cooled by a liquid, a light source high in luminance can be used. Also, the luminance of an image to be displayed can be enhanced.

According to still another aspect of the present invention, there is provided a display unit, characterized by comprising:

a plurality of optical modulation elements integrated together using the same substrate;

an optical path length correction lens disposed in correspondence with at least one of said plurality of optical modulation elements; and means for synthesizing and projecting images optically modulated by said plurality of optical modulation elements.

In the above-mentioned structure, an example of the plurality of optical modulation elements integrated using the same substrate is shown in FIG. 4. In the structure shown in FIG. 4, liquid-crystal panels indicated by reference numerals 113 to 115 function as optical modulation elements. Those liquid-crystal panels are integrated using a pair of glass substrates 106 and 107. In this example, there is shown the glass substrates, instead of which quartz substrates may be used.

In the structure shown in FIG. 4, an image of R is optically converted by the liquid-crystal panel 113. An image of G is optically converted by the liquid-crystal panel 114. An image of B is optically converted by the liquid-crystal panel 115.

As shown in FIG. 4, in the case where a plurality of liquid-crystal panels (optical modulation elements) are integrated together using the same substrate, the structure of the entire unit can be simplified. Also, the entire unit can be downsized.

In the structure shown in FIG. 4, lenses indicated by reference numerals 141 to 143 are optical path length correction lenses for correcting the focal distances of images from the respective liquid-crystal panels. The focal distances of images from the respective liquid-crystal panels are adjusted by those lenses 141 to 143 so that the focal positions of the respective images of RGB can be identical to each other at a stage where those images pass through a projection lens 119.

In the structure shown in FIG. 4, the optical path length correction lenses 141 to 143 are disposed in correspondence with the liquid-crystal panels 113 to 116 for RGB, respectively. Also, in the structure shown in FIG. 4, the respective images of RGB are synthesized by a mirror 116, a semi-transparent mirror 117 and a semi-transparent mirror 118 in such a manner where a color image is projected from the projection lens 119 onto a screen 120. The structure shown in FIG. 4 are so arranged as to synthesize three images of RGB, in which an optical path length correction lenses may be provided for at least one image, preferably for two images. Also, for example, in the case where images from two liquid-crystal panels are synthesized, an optical path length correction lens may be provided for at least one image.

With a plurality of optical modulation elements being integrated using the same substrate, the simplification and downsizing of the unit can be realized. Also, with the optical path length correction lens being disposed in correspondence with at least one optical modulation element, in the case where the images from the respective optical modulation elements are synthesized, the focal positions of the respective images (imaging positions) can be made identical to each other so that the respective images are prevented from being shifted.

According to yet still another aspect of the present invention, there is provided a display unit, comprising:

color filters for RGB;

at least three liquid-crystal panels disposed in correspondence with RGB, respectively;

a coolant being in contact with said liquid-crystal panels; and a light shield film for shielding a part of said liquid-crystal panels where the color filters for RGB are piled on each other;

characterized in that light beams coming out of said respective liquid-crystal panels pass through said coolant with different lengths, respectively, and said three liquid-crystal panels disposed in correspondence with RGB are integrated together using the same substrate.

According to another structure of the present invention, there is provided a display unit, comprising:

color filters for RGB;

at least three liquid-crystal panels disposed in correspondence with RGB, respectively;

a light shield film for shielding a part of said liquid-crystal panels where the color filters for RGB are piled on each other;

wherein the focal distances of light beams coming out of said respective liquid-crystal panels are identical or substantially identical to each other using an optical system; and characterized in that said three liquid-crystal panels disposed in correspondence with RGB are integrated together using the same substrate.

In the present invention with the above-mentioned structure, the color filters for RGB are provided on the liquid-crystal panels so that images of RGB are formed on the liquid-crystal panels from a white light.

In order to solve the above-mentioned problems, according to yet still another aspect of the present invention, there is provided a display unit, characterized by comprising:

a plurality of liquid-crystal panels being integrated together using the same substrate, said plurality of liquid-crystal panels including a synchronous counter, an address decoder circuit that inputs an output signal from said synchronous clock counter as an address signal, and a plurality of signal lines or scanning lines connected to said address decoder circuit;

means for synthesizing images from said plurality of liquid-crystal panels;

means for setting the focal distances of images from said plurality of liquid-crystal panels, individually; and means for synthesizing and projecting the images the focal distances of which are adjusted.

In the above-mentioned structure, an up/down counter is preferably used as the synchronous clock counter.

In the above-mentioned structure, it is useful that a coolant is disposed in contact with the output side of the liquid-crystal panel, and the focal distances of the images from said respective liquid-crystal panels are set by allowing said respective liquid-crystal panels to pass through said coolant with respective lengths, respectively.

Also, as a method of setting the focal distances of the images from the respective liquid-crystal panels, individually, a focal distance adjustment lens may be disposed for each image, correspondingly.

According to another structure of the present invention, there is provided a display unit, characterized by comprising:

a plurality of active matrix type liquid-crystal panels for conducting a multi-tone display being integrated together using the same substrate;

wherein each of said liquid-crystal panels includes:

a synchronous clock counter;

an address decoder circuit that inputs an output signal of said synchronous clock counter as an address signal;

a tone holding circuit for holding tone data;

a tone synchronous circuit for synchronizing an output timing of the tone data held by said tone holding circuit with a scanning timing of said display unit; and a circuit for converting the tone data synchronized by said tone synchronous circuit into an analog tone voltage.

In other words, according to the present invention, the signal lines or the scanning lines are selected by the address decoder circuit, and the output signal of the synchronous clock counter is used as the address signal inputted to the address decoder circuit.

According to the present invention, the output signal of the synchronous counter with respect to the clock input is inputted to the address decoder circuit as the address signal. This structure enables a linear sequential scanning operation using no shift register, that is, which is not of a delay signal transmission type.

The display unit drive circuit of the present invention can remarkably reduce the number of input terminals in comparison with the system in which the signal lines or the scanning lines are merely selected by the address decoder system because only one input signal line to the drive circuit is required for only a clock pulse. As a result, the unit can be downsized.

Also, in the address decoder circuit, even though a defect occurs in a circuit connected to one signal line (or one scanning line), the defect does not adversely affect the operation of any circuits which are connected to other signal lines (or scanning lines). Hence, the present invention can prevent all the circuits downstream of a defective portion when a defect occurs in a circuit from becoming inoperative in display operation, which is a problem in the drive circuit using the shift register circuits. As a result, the display unit that conducts an excellent display can be obtained with an improved yield.

Further, in the drive circuit of the present invention, a direction of selecting the signal lines or the scanning lines can be readily change in a forward direction or a backward direction by selecting whether the synchronous counter should be operated at the rising of a clock signal (up count) or at the falling thereof (down count), with the result that the bidirectional drive can be made without increasing the number of drive circuits. Furthermore, the present invention uses a synchronous counter applicable to a high clock frequency.

The above and other objects and features of the present invention will be more apparent from the following description taken in conjunction with the accompanying drawings.

DETAILED DESCRIPTION OF THE PREFERRED EMBODIMENTS

Now, a description will be given in more detail of embodiments of the present invention with reference to the accompanying drawings.
(First Embodiment)

A first embodiment relates to a structure of synthesizing images corresponding to RGB, respectively, formed by liquid-crystal electro-optical units (liquid-crystal panels) and projecting a color image.

In the structure of this embodiment, (A) the respective liquid-crystal panels corresponding to RGB are integrated into one piece; and (B) the cooling of the liquid-crystal panels and the adjustment of optical path lengths (the focal distances of optical images) of the liquid-crystal panels are conducted at the same time, using a liquid having an appropriate refractive index. Then, all the images of RGB are made uniform in optical path length (the focal distance of an optical image).

Figure 1:
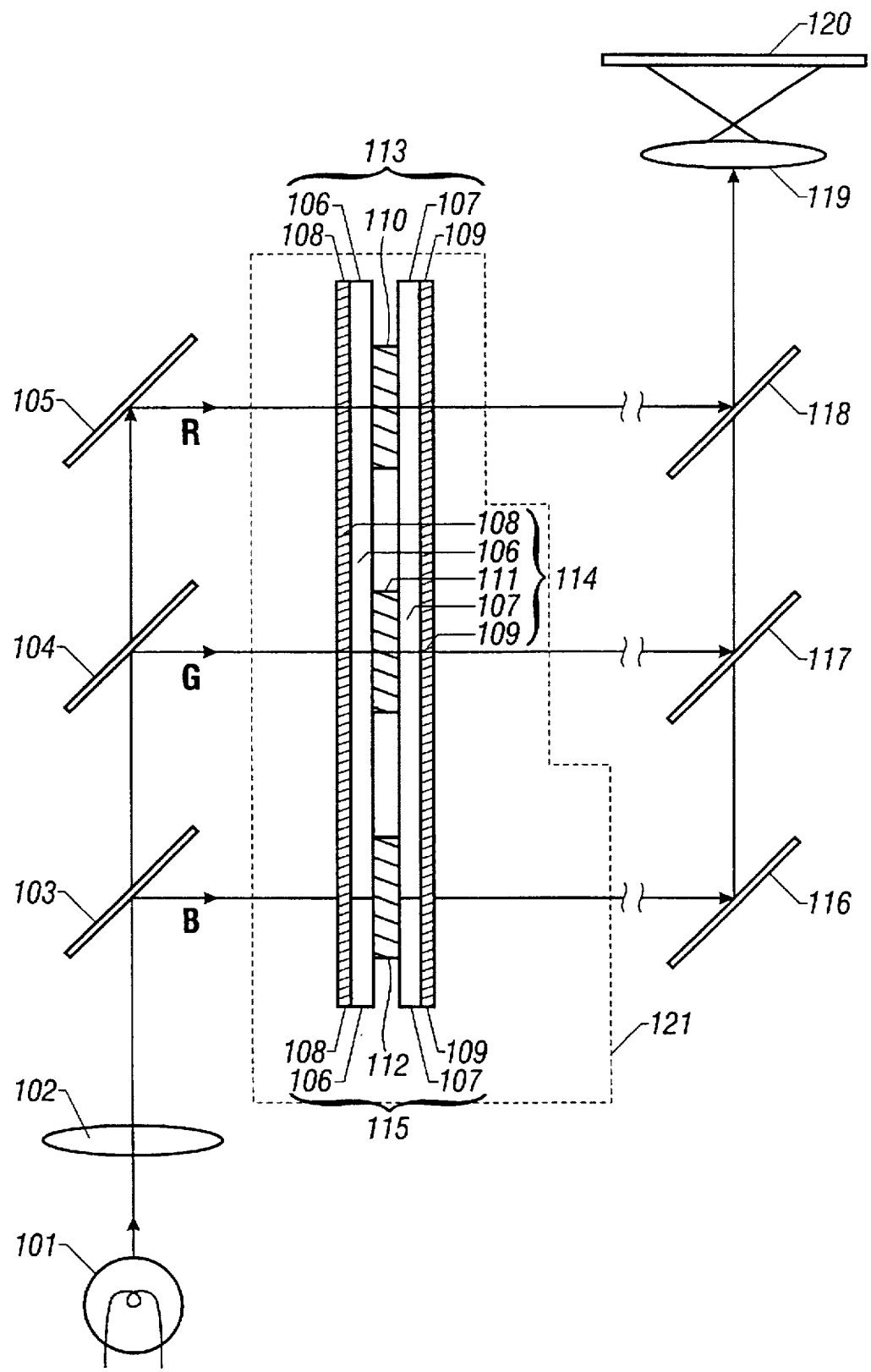
FIG. 1 is a structural diagram showing a projection type liquid-crystal display unit in accordance with a first embodiment of the present invention.

FIG. 1 is a structural diagram showing the outline of a projection type liquid-crystal display unit in accordance with this embodiment. In FIG. 1, a light coming out of a lamp 101 that generates a white light as a light source is corrected to a light beam (parallel light beam) which is uniform in a progressive direction by a lens 102, and then split into light beams corresponding to RGB (red, blue, green), respectively, by dichroic mirrors 103, 104 and 105.

Only the light beam having a wavelength component corresponding to B is reflected by the dichroic mirror 103, and other components penetrate the dichroic mirror 103. The light beam of B reflected by the dichroic mirror 103 is incident to a liquid-crystal panel 115 for B where it is subjected to a predetermined optical modulation into a B image.

Only a waveform component corresponding to G, of light beam that has penetrated the dichroic mirror 103 is reflected by the dichroic mirror 104, and other components thereof penetrates the dichroic mirror 104. The light beam of a wavelength component corresponding to G is subjected to a predetermined optical modulation into a G image by a liquid-crystal panel 114 for G.

Only a waveform component corresponding to R, of light beam that has penetrated the dichroic mirror 104 is reflected by the dichroic mirror 105, and other components thereof penetrates the dichroic mirror 104. The light beam of a wavelength component corresponding to R is subjected to a predetermined optical modulation into a R image by a liquid-crystal panel 113 for R.

The liquid-crystal panels 113 to 115 are optical modulation elements that function as independent liquid-crystal electro-optical units, but integrally structured. TN type liquid crystal 110 to 112 are held between glass substrates 106 and 107 at predetermined intervals. Portions that hold the liquid crystals 110 to 112 function as the liquid-crystal panels 113 to 115. Further, a pair of polarizing plates 106 and 110 are arranged outside of the glass substrates.

Also, although not shown, there are formed a sealant for sealing liquid crystal within a predetermined region, an orientation film that orients liquid crystal, an electrode that applies a predetermined electric field to liquid crystal, a thin-film transistor which is a switching element for holding charges in the electrode, and a peripheral circuit (this peripheral circuit is also formed of a thin-film transistor) for driving the thin-film transistor.

The image of B which has been subjected to an optical modulation by the liquid-crystal panel 115 is reflected by a mirror 116 and then incident to the projection lens 119 through semi-transparent mirrors 117 and 118. The image of G which has been subjected to an optical modulation by the liquid-crystal panel 114 is reflected by the semi-translucent mirror 117 and then incident to the projection lens 119 through semi-transparent mirror 118. The image of R which has been subjected to an optical modulation by the liquid-crystal panel 113 is reflected by the semi-translucent mirror 118 and then incident to the projection lens 119.

The images of RGB are synthesized at a stage where it is incident to the projection lens 119, and its synthesized image is imaged by the projection lens 119 and then projected onto a screen 120 or an appropriate projection face. In FIG. 1, the lens 102 and the projection lens 119 are shown as if they is formed of a single lens. However, the lens 102 and the projection lens 119 may be of a more complicated optical system depending on a required image quality.

In the structure shown in FIG. 1, the entire liquid-crystal panels 113 to 115 are immersed in a coolant. The coolant exists in a region indicated by a dotted line 121. The coolant need be made of a material which is high in refractive index as well as translucent property. In the region 112, a window need be formed with a translucent material at a light incoming portion and a light outgoing portion. Also, the liquid-crystal cell need be sufficiently sealed so that the coolant is prevented from entering within the liquid-crystal cell formed of the glass substrates 106, 107 and so on.

It is preferable that the coolant is made of an inactive material represented by a fluorine liquid from the viewpoint of shielding the liquid-crystal cell so that moisture is prevented from entering within the liquid-crystal cell from the exterior.

Also, although not shown in FIG. 1, a heat radiator made of an appropriate material may be disposed in order to cool the coolant existing in the region 121.

In the structure shown in FIG. 1, because spacial distances between the respective liquid-crystal panels 113 to 115 and the projection lens 119 are different from each other, the focal face of the images of RGB differs from each other. For that reason, the distances of the light beams outgoing from the respective liquid-crystal panels 113 to 115 that pass through the coolant are set in accordance with the spacial distances of from the liquid-crystal panels 113 to 115 to the projection lens 119 in such a manner that the respective focal positions of the images of RGB that arrive at the projection lens 119 from the respective liquid-crystal panels 113 to 115 are made identical to each other. Since the refractive index of the coolant is higher than that of air, the focal distance of the image can be shortened by making the image pass through the coolant.

Figure 2:
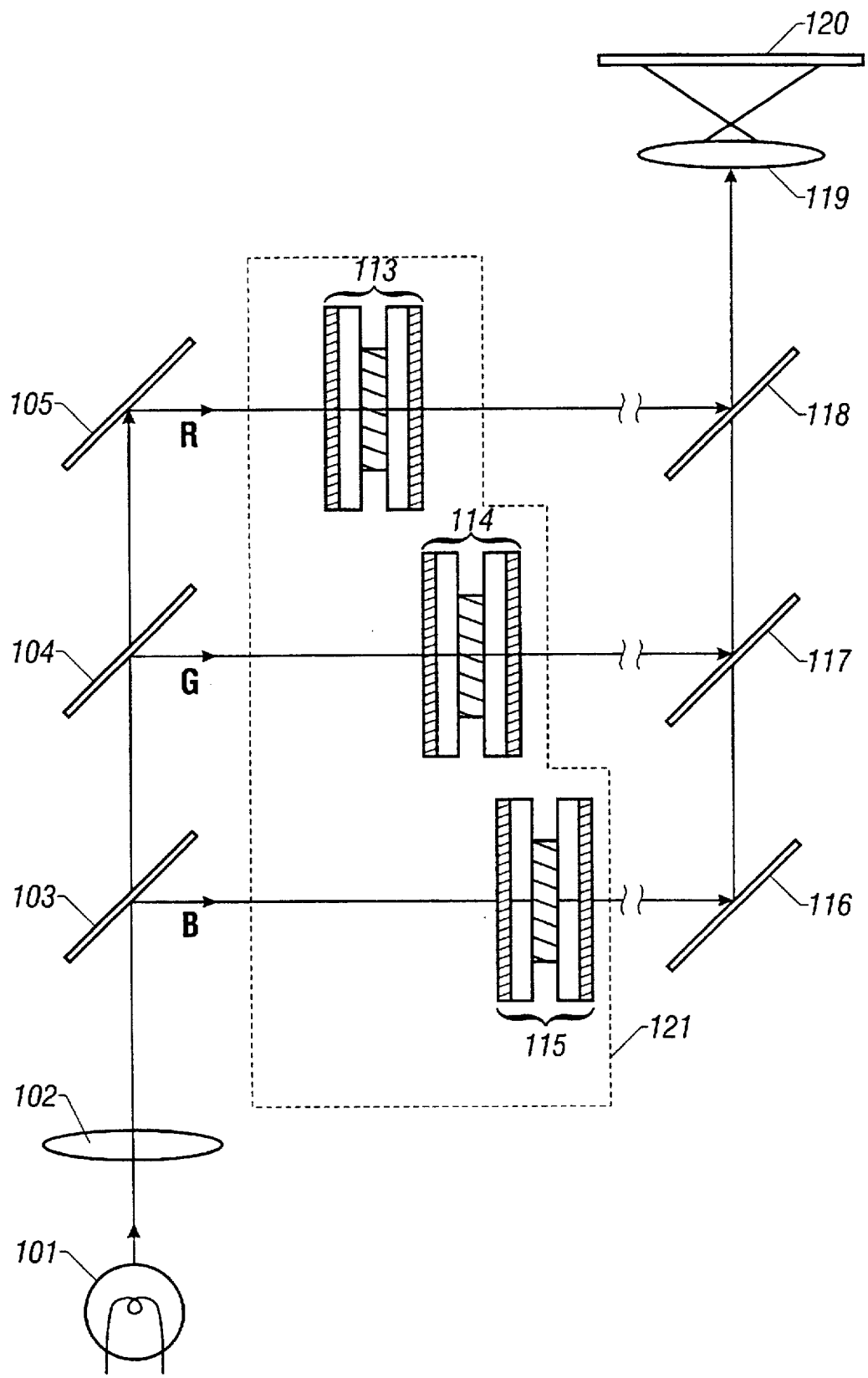
FIG. 2 is a schematic diagram for explaining the operation of a coolant for correcting an optical path length.

For example, the spacial distance of from the liquid-crystal panel 114 to the projection lens 119 is longer than that of from the liquid-crystal panel 113 to the projection lens 119. Accordingly, in order to make the image (light) outgoing from the liquid-crystal panel 114 identical to the image (light) outgoing from the liquid-crystal panel 113, the focal distance of G image outgoing from the liquid-crystal panel 114 is shortened. For that reason, the G image outgoing from the liquid-crystal panel 114 are allowed to pass through the coolant with a longer distance. A state such that the position of the liquid-crystal panel 114 apparently approaches the projection lens 119 side, as shown in FIG. 2 can be realized. Then, with such a state, the focal position of the image outgoing from the liquid-crystal panel 111 can be made identical to that outgoing from the liquid-crystal panel 113.

The spacial distance of from the liquid-crystal panel 115 to the projection lens 119 is longer than that of from the liquid-crystal panel 114 to the projection lens 119. Accordingly, the B image outgoing from the liquid-crystal panel 115 are allowed to pass through the coolant with a longer distance. As a result, the focal distance of B image outgoing from the liquid-crystal panel 115 can be shortened. In other words, viewed from the projection lens 119, a state such that the liquid-crystal panel 114 apparently optically approaches the projection lens 119 side, as shown in FIG. 2 can be realized. Then, the focal position of G image outgoing from the liquid-crystal panel 114 can be made identical to the focal position of B image outgoing from the liquid-crystal panel 115. It should be noted that the same signs as those in FIG. 1 indicate the like members.

In the above-mentioned manner, the focal distances of the respective images of RGB are changed so that the focal positions (imaging positions) of the respective images can be finally made identical to each other on the projection lens 119. The accuracy of making the focal positions of the respective images identical to each other may fall within a predetermined range in accordance with a required image quality.

The structure shown in FIG. 1 is characterized in that the lengths of the images from the respective liquid-crystal panels passing through the coolant for cooling the liquid-crystal panel are set so that a position at which the images from the respective liquid-crystal panels are formed is set appropriately.

In other words, the structure is characterized in that the light beams outgoing from the respective liquid-crystal panels are finally focussed (imaged) at the same position, using the phenomenon that the focal distances of images that pass through the coolant are shortened in accordance with the refractive index of the coolant.

With the application of the structure according to this embodiment, the focal positions (imaging positions) of the respective images of RGB that pass through the lens 119 can be made identical to each other. With this arrangement, a clear image without shifting can be displayed by changing the focal point of the projection lens 119 even though a distance to the projection face is changed or the projection image is changed in size.

Another feature of the structure shown in FIG. 1 is that three liquid-crystal panel 113 to 115 corresponding to RGB are integrated into one piece within one liquid-crystal cell. With such a structure, the simplification of the manufacturing process can be realized, that is, a process (a panel assembling process) for injecting liquid crystal between the glass substrates 106 and 107 is sufficiently conducted only once.

Also, since the liquid-crystal panels for RGB are formed using the same substrate, the structure has a feature that the coincidence of the optical axes between the liquid-crystal panels 113 to 115 is unnecessary. Also, the structure is simplified and downsized.

The structure shown in FIG. 1 requires no adjustment process since the coincidence of the optical axes of the respective images of RGB and the focussing are made unnecessary by adjusting the optical system. This means that high productivity is obtained, and is very useful from the industrial viewpoint.

In the structure of this embodiment, a dichroic mirror may be used instead of the mirror 116 and semi-transparent mirrors 117, 118.

In the structure of this embodiment, a light beam corresponding to each wavelength region of RGB is obtained using dichroic mirrors 103 to 105. Instead, a light beam may be obtained using color filters. Also, light sources corresponding to RGB may be provided, individually.

The structure of the liquid-crystal panel may be of the passive matrix type or the active matrix type using the MIM type element. A liquid-crystal material may be a ferroelectric liquid crystal or a polymer dispersed liquid crystal.

With the structure of this embodiment, all the following required items can be satisfied.

(1) The overall structure is downsized as much as possible (simplified).

(2) The structural elements are reduced in number.

(3) The structure is so designed as to restrain a rising of temperature.

(4) The structure are so designed that the respective optical axes of RGB images readily coincide with each other.

(5) The structure is so designed that the lengths of optical paths for RGB are made uniform.

That is, the liquid-crystal panels 113 to 115 corresponding to RGB, respectively, are integrated together as shown in FIG. 1, thereby being realizing the required items (1), (2) and (4).

Also, since the liquid-crystal panels 113 to 115 are integrated together, and cooling means for the liquid-crystal panels and means for making the focal positions of the respective images of RGB identical to each other are constituted using liquid, the required items (1), (2), (3) and (5) can be realized.

Further, since the integrated RGB liquid-crystal panels are cooled with liquid, a simple structure can be realized and a cooling efficiency can be enhanced. As a result, a lamp high in the intensity of light emission can be used, and an image having a high luminance can be displayed.

(Second Embodiment)

Figure 3:
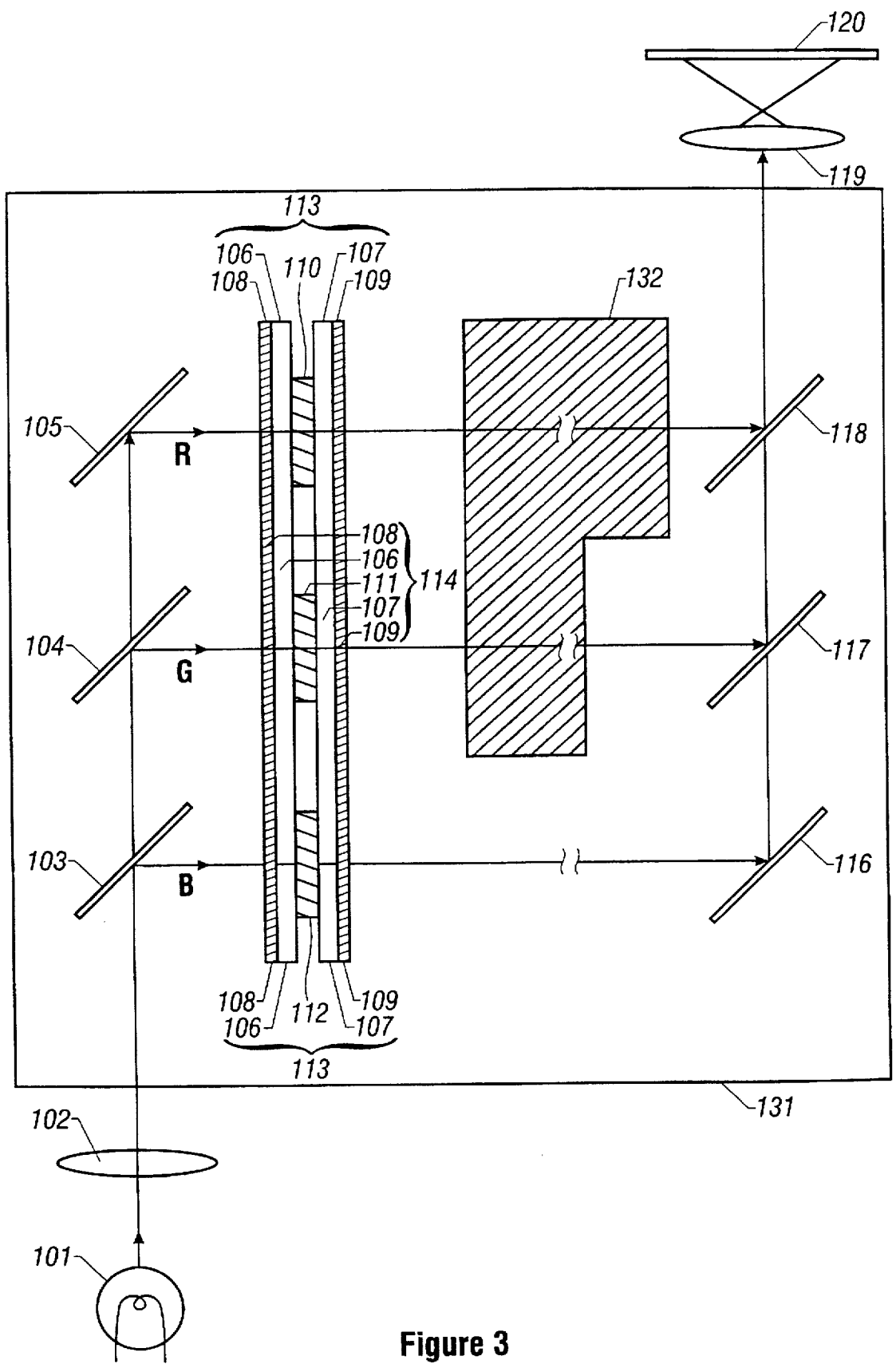
FIG. 3 is a structural diagram showing a projection type liquid-crystal display unit in accordance with a second embodiment of the present invention.

A second embodiment is a modified example of the first embodiment, and is characterized in that, in addition to the liquid-crystal panels, dichroic mirrors constituting an optical system, and so on are similarly immersed in liquid. FIG. 3 shows a schematic structure of this embodiment. In FIG. 3, the same signs as those in FIG. 1 represent like members.

In FIG. 3, reference numeral 131 denotes a casing which is filled with a coolant. Dichroic mirrors 103 to 105, the respective liquid-crystal panels 113 to 115 for RGB, a mirror 116 and semi-transparent mirrors 117, 118 are received in the casing 131 in a liquid-immersed state. Because the rising of a temperature of the entire unit is restrained with the casing 131 being filled with the liquid, the cooling effect can be enhanced. Also, dusts can be prevented from being attached onto the surface of an optical member such as dichroic mirrors.

Furthermore, in the structure shown in FIG. 3, a portion indicated by reference numeral 132 is a hollow which is filled with not liquid but air (or inactive gas). With such a structure, the focal distances of RGB images from the respective liquid-crystal panels 113 to 115 are changed, thereby making the focal positions of the respective images of RGB that pass through a projection lens 119 identical to each other.

Because the image is allowed to pass through hollow portion 132, the focal distance of the image is prolonged in accordance with the passing distance. This is because the refractive index of air or inactive gas is lower than that of liquid. Hence, the existing positions of the liquid-crystal panels 113 to 115 are apparently far from the projection lens 119 in accordance with the passing distances of the hollow portion 502 (the passing distances of images from the respective liquid-crystal panels) in the stated order. In other words, the optical distances between the liquid-crystal panels 113 and 114 and the projection lens 119 are prolonged. Then, the optical length is adjusted so as to be prolonged so that the focal positions of the respective images of RGB can coincide with each other on the projection lens 119.

In other words, the optical lengths of from the respective liquid-crystal panels to the projection lens 119 are made identical to each other, whereby the focal positions of the respective images of RGB can coincide with each other.

Although being not apparent from FIG. 3, the casing 131 and a part of the hollow portion 132 whom a light beam (image) penetrates need be made of a translucent material.

(Third Embodiment)

A third embodiment relates to a structure of synthesizing images of RGB formed by liquid-crystal electro-optical units (liquid-crystal panels) and projecting a color image. In the structure of this embodiment, (A) the respective liquid-crystal panels corresponding to RGB are integrated into one piece; and (B) the adjustment of optical path lengths (the focal distances of optical images) of the liquid-crystal panels are conducted using an appropriate optical system. Then, all the images of RGB are made uniform in optical path length (the focal distance of an optical image).

Figure 4:
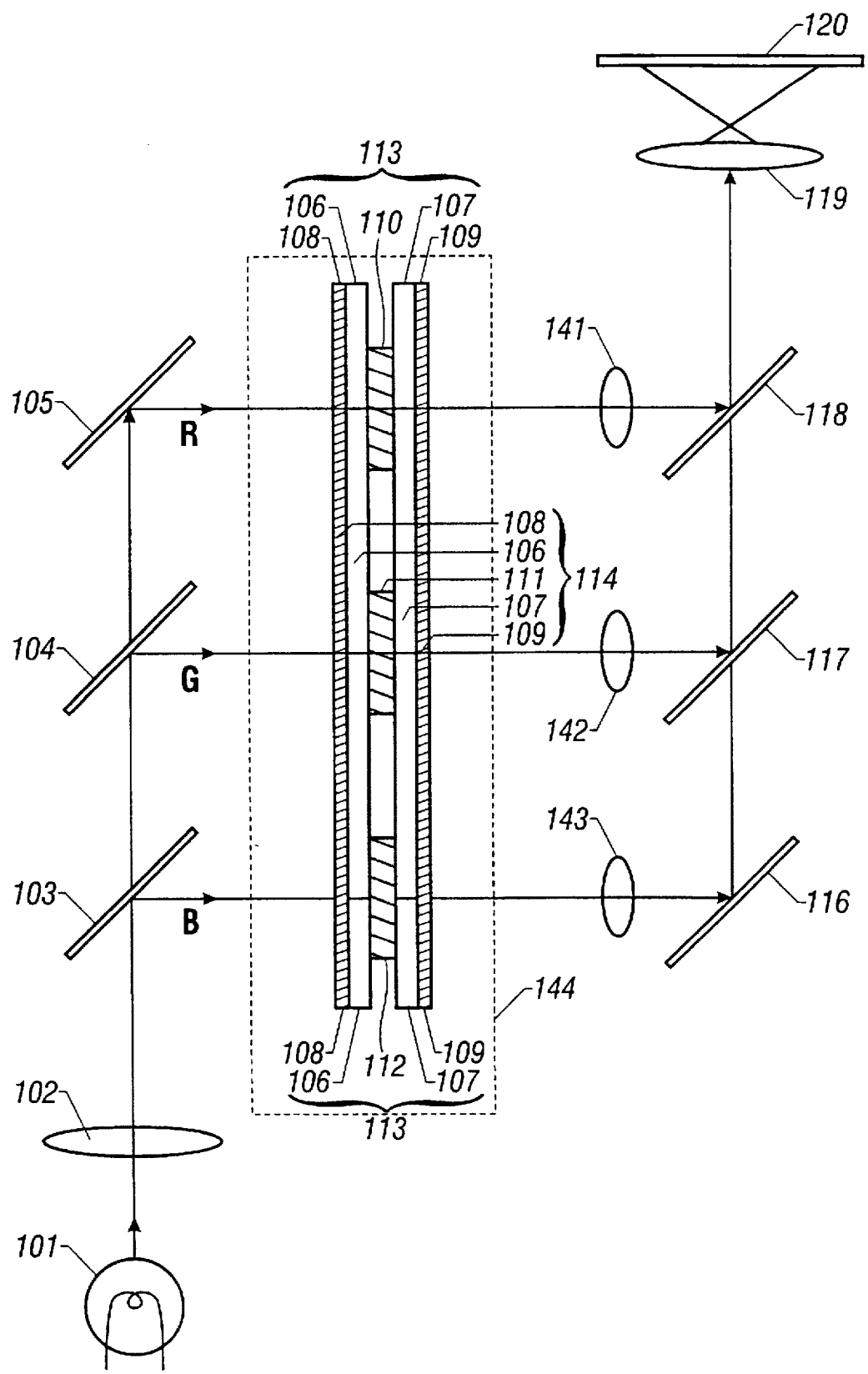
FIG. 4 is a structural diagram showing a projection type liquid-crystal display unit in accordance with a third embodiment of the present invention.

FIG. 4 is a structural diagram showing the outline of a projection type liquid-crystal display unit in accordance with this embodiment. In FIG. 4, the same signs as those in FIG. 1 represent like members. As the means for correcting the optical path length, liquid is used in the first embodiment, and gas is used in the second embodiment. In this embodiment, an optical member is used for correcting the optical path length.

As shown in FIG. 4, optical path length correction lenses 141, 142 and 143 for correcting the optical path lengths are disposed on the optical paths at the outgoing side of liquid-crystal panels 113 to 115, respectively. The optical characteristics of those lenses 141 to 143 are selected so that the focal points of the RGB images from the liquid-crystal panels 113 to 115 coincide with each other. Or, their location positions are adjusted.

The images of RGB are synthesized at a stage where they are incident to the projection lens 119. Then, the synthesized image is adjusted in focal point by the projection lens 119 and then projected on a screen 120 or an appropriate projection face. In FIG. 4, the lens 102, the projection lens 119 and the lenses 141 to 143 are shown as if they is formed of a single lens. However, they are not limited by or to the use of a single lens and may be of a more complicated optical system depending on a required image quality.

With the application of the structure shown in this embodiment, the focal positions (imaging positions) of the respective images of RGB that pass through the lens 119 can coincide with each other. With this arrangement, a clear image without shifting can be displayed by changing the focal point of the projection lens 119 even though a distance to the projection face is changed or the projection image is changed in size.

In the structure shown in FIG. 4, the optical characteristics of the lenses 141 to 143 and their location positions are adjusted in accordance with the spacial distances of from the respective liquid-crystal panels to the projection lens 119 so that the respective images of RGB are focussed (imaged) at the same position on the projection lens 119. The accuracy of making the focal positions (imaging positions) of the respective images of RGB coincide with each other may fall within a predetermined range in accordance with a required image quality. Also, it is unnecessary to provide the focal distance correction lenses (indicated by reference numerals 141 to 143 in FIG. 4) in correspondence with all the images of RGB. For example, in order to make the focal points of images of R and G coincide with the focal point of an image of G, lenses may be disposed in only the optical paths along which images of R and G pass.

Furthermore, in the structure shown in FIG. 4, the entire integrated liquid-crystal panels 113 to 115 are immersed in a coolant. The coolant exists in a region indicated by a dotted line 144. The coolant need be made of a material high in translucent property. In at least a portion where a light beam penetrate, a window need be formed with a translucent material. Also, the liquid-crystal cell need be sufficiently sealed so that the coolant is prevented from entering within the liquid-crystal cell. The coolant may be made of a fluorine inactive liquid. Specifically, a liquid called "fluorinate" or a certain oil such as a cedar oil can be used. Also, it is preferable to use an inactive material represented by a fluorine liquid from the viewpoint of shielding the liquid-crystal cell so that moisture is prevented from entering within the liquid-crystal cell from the exterior.

Also, although not shown in FIG. 4, a heat radiator made of an appropriate material may be disposed in order to cool the coolant existing in the region 144.

In this embodiment, because three liquid-crystal panels for RGB are integrated and cooled with a liquid, a simple structure can be realized and a cooling efficiency can be enhanced. As a result, a lamp high in the intensity of light emission can be used, and an image having a high luminance can be displayed.

(Fourth Embodiment)

Figure 10:
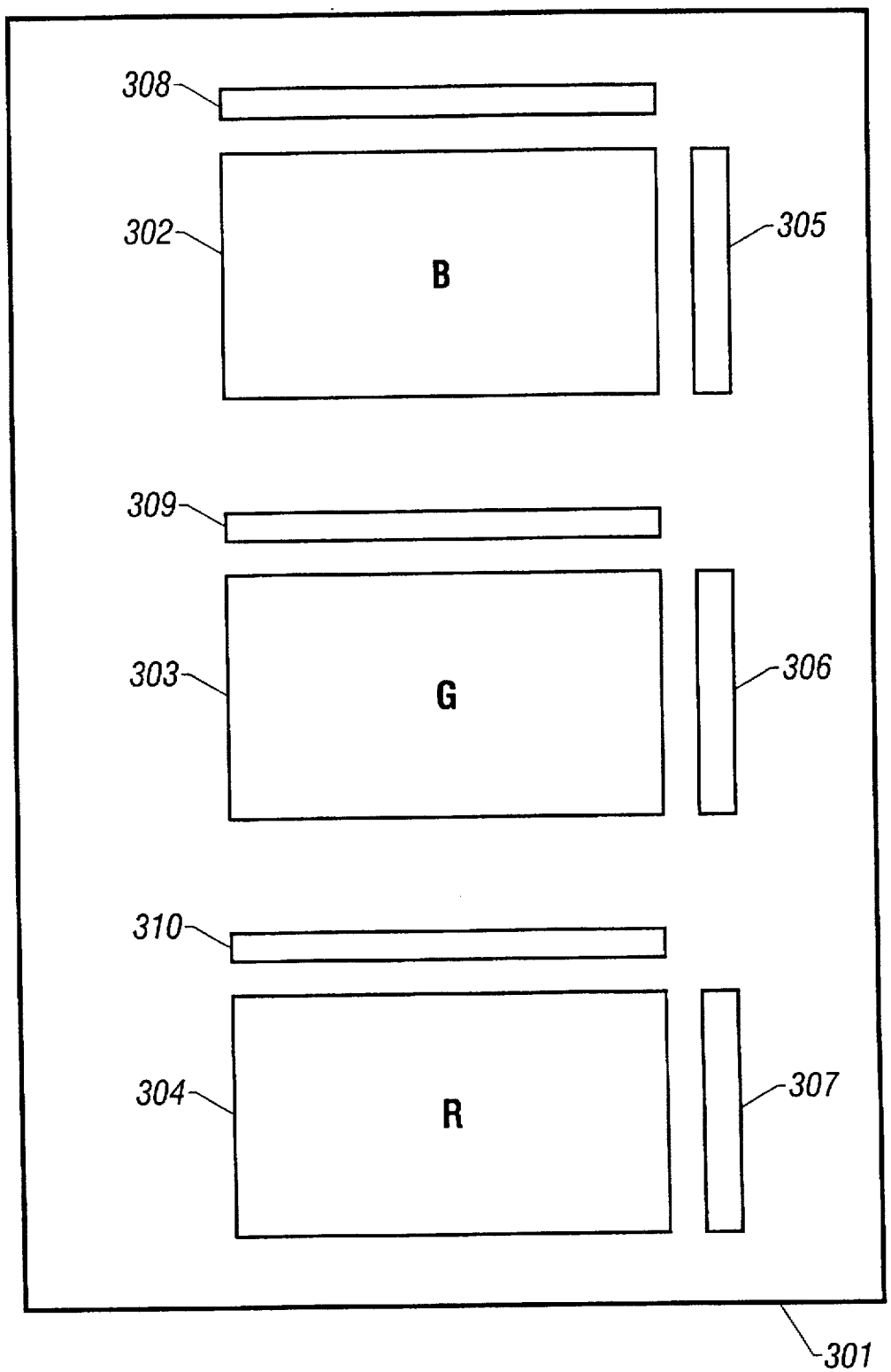
FIG. 10 is a top view showing a liquid-crystal panel in accordance with the fourth embodiment of the present invention.

A fourth embodiment relates to a structure in which integrated liquid-crystal panels 113 to 115 of RGB described in the first to third embodiments are integrated with a peripheral circuit that drives those liquid-crystal panels. FIG. 10 shows a block diagram of this invention. In this structure, the functions of three liquid-crystal panels are substantially built in one liquid-crystal panel, and a pair of glass substrates constituting the panel and a polarizing plate are commonly used.

As shown in FIG. 10, there is shown a structure in which three active matrix type liquid-crystal panels for RGB are integrated on one glass substrate 301. For example, what is indicated by reference numeral 107 in FIG. 1 is a glass substrate 301 in FIG. 10.

As shown in FIG. 10, the active matrix type pixel sections 203 to 304 for R, G and B are connected with scanning line drive circuits 305 to 307 and signal line drive circuits 308 to 310, respectively. In pixel sections 302 to 304, switching thin-film transistors are disposed on the respective pixel electrodes arranged in the form of a matrix, and drive circuits 305 to 310 are formed of thin-film transistors. The thin-film transistors constituting the pixel sections 302 to 304 and the drive circuits 305 to 310 are formed of a crystalline silicon film obtained by crystallizing an amorphous silicon film formed on a glass substrate 301 through the irradiation of a laser beam and a heat treatment.

It should be noted that the glass substrate 301 may be replaced by a substrate made of quartz or other materials having a translucent property.

(Fifth Embodiment)

A fifth embodiment relates to a structure of synthesizing images corresponding to the respective images of RGB formed by liquid-crystal electro-optical units (liquid-crystal panels) and projecting a color image. In the structure of this embodiment, (A) the respective liquid-crystal panels corresponding to RGB are integrated into one piece; and (B) the adjustment of optical path lengths (the focal distances of optical images) of the liquid-crystal panels are conducted using an appropriate optical system. Then, all the images of RGB are made uniform in optical path length (the focal distance of an optical image).

Figure 5:
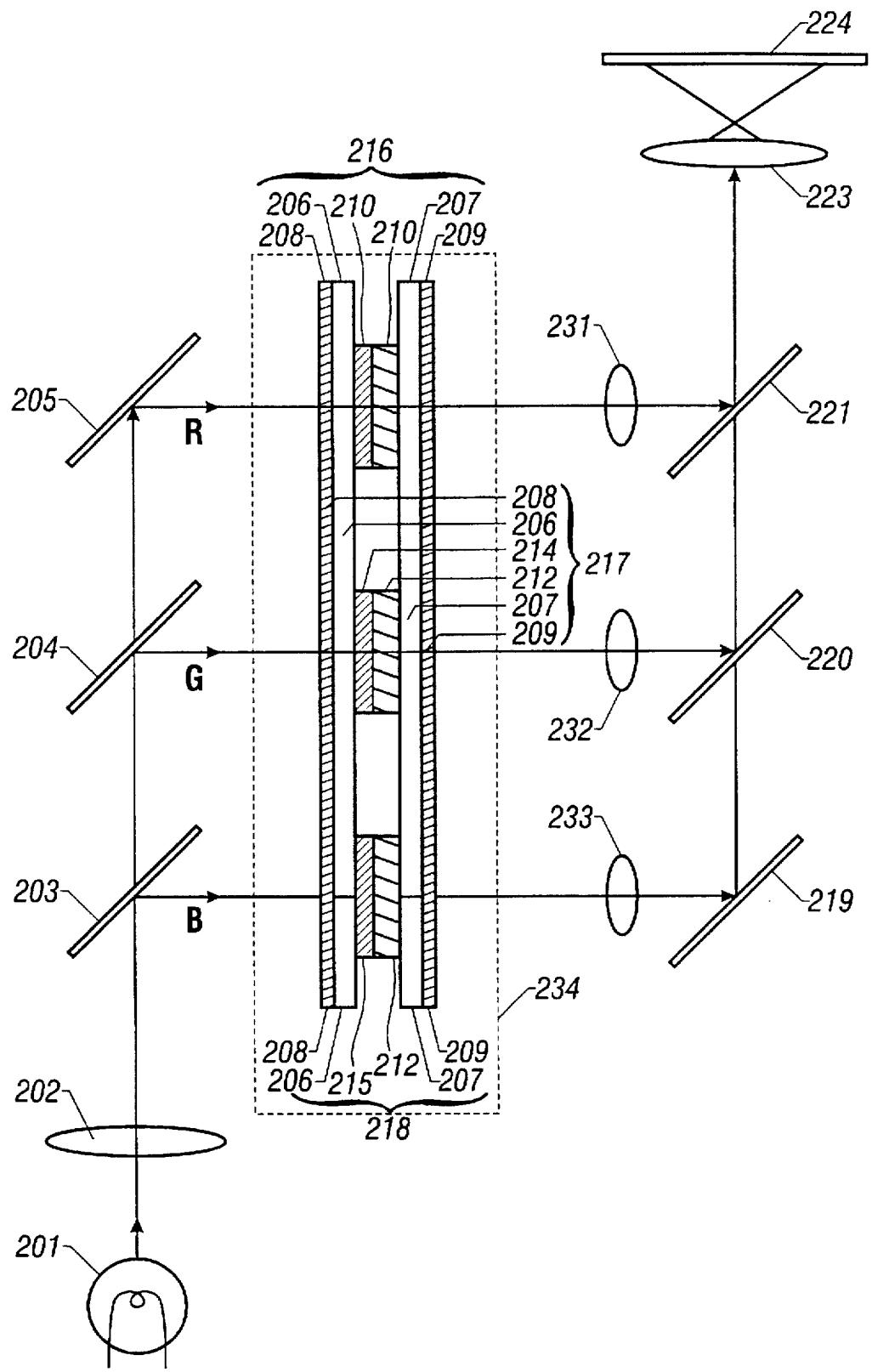
FIG. 5 is a structural diagram showing a projection type liquid-crystal display unit in accordance with a fifth embodiment of the present invention.
Figure 6:
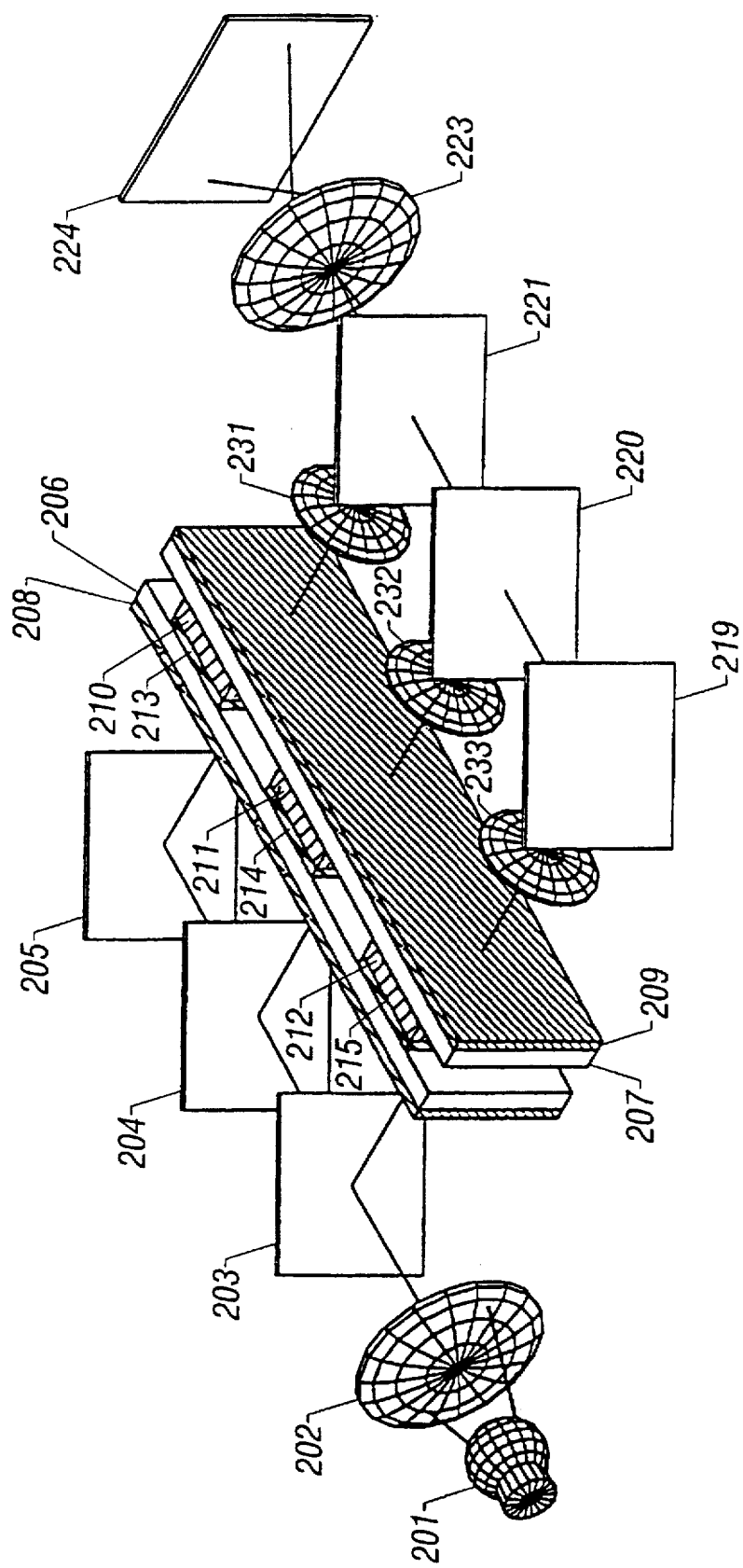
FIG. 6 is a perspective view showing a projection type liquid-crystal display unit in accordance with a fifth embodiment of the present invention.

FIG. 5 shows the outline of a projection type liquid-crystal display unit in accordance with this embodiment. FIG. 6 shows a solid diagram of the liquid-crystal display unit viewed from an oblique direction of FIG. 5. In FIG. 5 (FIG. 6), a light coming out of a lamp 201 that generates a white light as a light source is corrected to a light beam (parallel light beam) which is uniform in a progressive direction by a lens 202, and then reflected by semi-transparent mirrors 203, 204 and a mirror 205. The reflected light beams (white light) are incident to the respective liquid-crystal panels 216 to 218 for RGB, respectively.

Those three liquid-crystal panels 216 to 218 are fabricated integrally, and TN type liquid crystal 210 to 212 are held between glass substrates 206 and 207 at predetermined positions, respectively, and a color filter 213 for R (red), a color filter 214 for G (green) and a color filter 215 for B (blue) are disposed in contact with the liquid crystal 210 to 212 (or through an insulating film or the like). Hence, the white light beams that has penetrate the color filters 213 to 216 are changed into a red light beam, a green light beam and blue light beam, respectively.

Furthermore, although not shown, there are formed a sealant for sealing liquid crystal 210 to 212 within a predetermined region, an orientation film that orients the liquid crystal 210 to 212, an electrode that applies a predetermined electric field to the liquid crystal 210 to 212, a thin-film transistor which is a switching element for holding charges in the electrode, and a peripheral circuit (this peripheral circuit is similarly formed of a thin-film transistor) for driving the thin-film transistor.

In the structure shown in FIGS. 5 and 6, the entire liquid-crystal panels 216 to 218 are immersed in the coolant. The coolant exists in a region indicated by a dotted line 234. The coolant need be made of a material high in translucent property. In at least a portion where a light beam incomes or outgoes, a window need be formed with a translucent material. Also, the liquid-crystal cell need be sufficiently sealed so that the coolant is prevented from entering within the liquid-crystal cell. The coolant may be made of a fluorine inactive liquid. Specifically, a liquid called "fluorinate" or a certain oil such as a cedar oil can be used. Also, it is preferable to use an inactive material represented by a fluorine liquid from the viewpoint of shielding the liquid-crystal cell so that moisture is prevented from entering within the liquid-crystal cell from the exterior. Also, although not shown in FIG. 5, a heat radiator made of an appropriate material may be disposed in order to cool the coolant existing in the region 234.

As shown in FIGS. 5 and 6, optical path length correction lenses 231 to 233 are disposed on the optical paths of the light beams from the liquid-crystal panels 216 to 218 in the outgoing directions, respectively. A mirror 219, semi-transparent mirrors 220 and 221 are arranged along the same optical path in the outgoing direction of the lenses 231 to 233, respectively. Furthermore, on that optical path, there are disposed a projection lens 223 and a screen 224.

A white light coming out of a lamp 201 is changed to a light beam (parallel light beam) through a lens 202 and then split in two directions by a semi-transparent mirror 203. The light beam reflected by the semi-transparent mirror 203 is incident to the liquid-crystal panel 218 for B and then subjected to a predetermined optical modulation into a B image. A light beam that has penetrated the semi-transparent mirror 203 is split in two directions by a semi-transparent mirror 204. The light beam reflected by the semi-transparent mirror 204 is incident to the liquid-crystal panel 217 for G and then subjected to a predetermined optical modulation into a G image. A light beam that has penetrated the semi-transparent mirror 204 is reflected by a mirror 105 and then incident to the liquid-crystal panel 216 for R so as to be subjected to a predetermined optical modulation into an R image.

The B image subjected to the optical modulation by the liquid-crystal panel 218 is adjusted in its focal distance by the lens 233, reflected by the mirror 219 and penetrate the semi-transparent mirrors 220 and 221 before being incident to the projection lens 223. The G image subjected to the optical modulation by the liquid-crystal panel 217 is adjusted in its focal distance by the lens 232, reflected by the semi-transparent mirror 220 and then incident to the projection lens 119 through the semi-transparent mirror 221. The R image subjected to the optical modulation by the liquid-crystal panel 216 is adjusted in its focal distance by the lens 231, reflected by the semi-transparent mirror 221 and then incident to the projection lens 119.

The optical characteristics of the lenses 231 to 233 are selected so that the R image, the G image and the B image from the liquid-crystal panels 216 to 218 are formed at the same position, or their location positions are adjusted. For that reason, the images of RGB are synthesized at a stage where they are incident to the projection lens 223, and its synthesized image is adjusted in its focal point by the projection lens 223 so as to be projected on a screen 120 or an appropriate projection face.

In this embodiment, because the focal positions (imaging positions) of the respective images of RGB that pass through the projection lens 223 can be made to coincide with each other by arranging the lenses 231 to 233, a clear image without shifting can be displayed by changing the focal face of the projection lens 223 even though a distance to the projection face is changed or the projection image is changed in size.

In FIGS. 5 and 6, the lens 202, the projection lens 223 as well as the lenses 231 to 233 are shown as if they are formed of a single lens. However, they are not limited by or to the use of a single lens and may be of a more complicated optical system depending on a required image quality.

In this embodiment, the optical characteristics of the lenses 231 to 233 and their location positions are adjusted in accordance with the spacial distances of from the respective liquid-crystal panels 216 to 218 to the projection lens 223 so that the respective images of RGB are focussed (imaged) at the same position on the projection lens 223. The accuracy of making the focal positions (imaging positions) of the respective images of RGB coincide with each other may fall within a predetermined range in accordance with a required image quality. Also, it is unnecessary to provide the focal distance correction lenses (indicated by reference numerals 231 to 233 in FIG. 5) in correspondence with all the images of RGB. For example, in order to make the focal points of the R image and the G image coincide with the focal point of an image of the G image, lenses may be disposed in only the optical paths along which the R image and the G image pass.

In this embodiment, the mirror 219, the semi-transparent mirror 220 and 221 may be replaced by dichroic mirrors.

The structure of the liquid-crystal panel may be of the passive matrix type or the active matrix type using the MIM type element. A liquid-crystal material may be a ferroelectric liquid crystal or a polymer dispersed liquid crystal.

(Sixth Embodiment)

Figure 7:
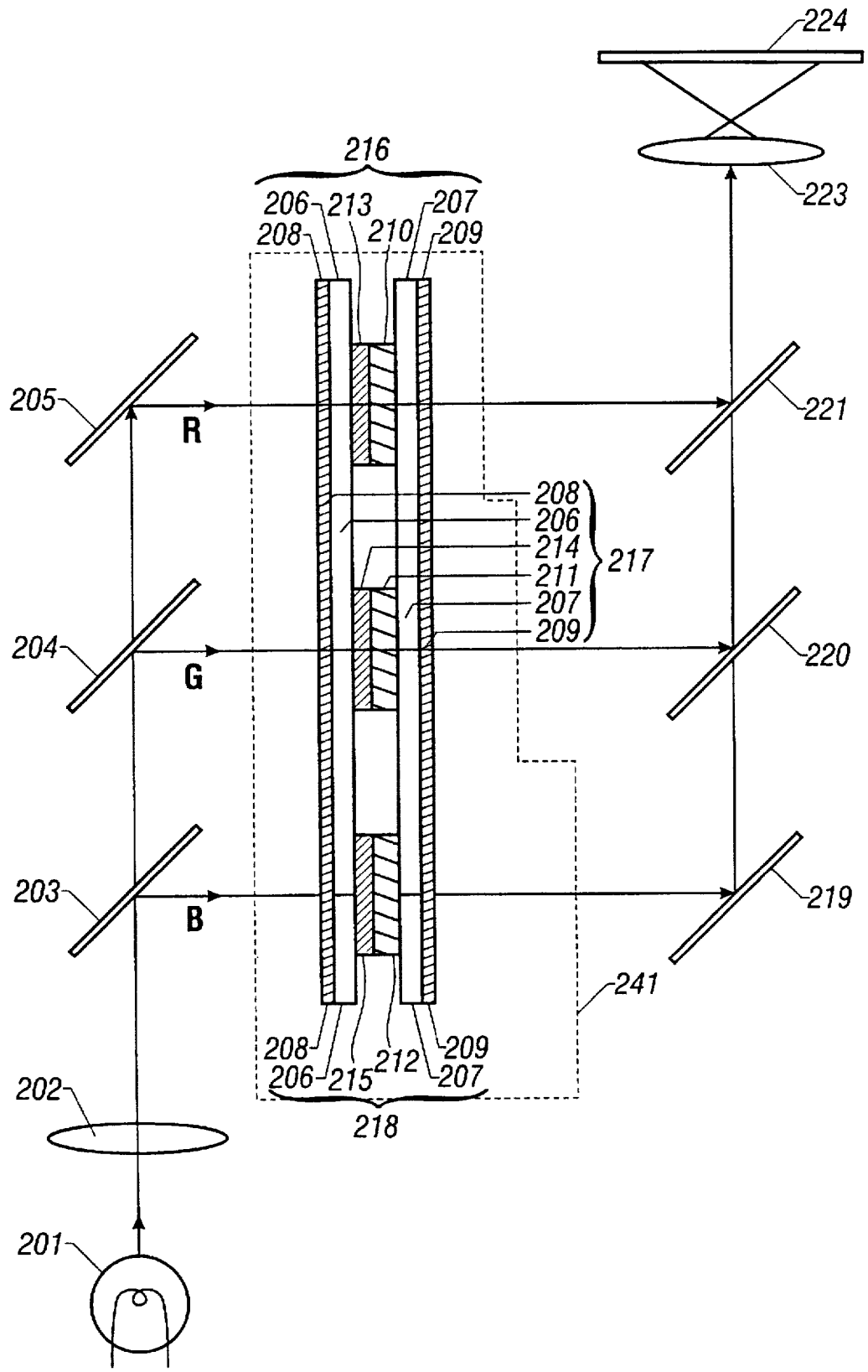
FIG. 7 is a structural diagram showing a projection type liquid-crystal display unit in accordance with a sixth embodiment of the present invention.

A sixth embodiment relates to a structure of synthesizing images corresponding to the respective images of RGB formed by liquid-crystal electro-optical units (liquid-crystal panels) and projecting a color image. In the structure of this embodiment, (A) the respective liquid-crystal panels corresponding to RGB are integrated into one piece; and (B) the cooling of the liquid-crystal panels and the adjustment of optical path lengths (the focal distances of optical images) are conducted using a liquid having an appropriate refractive index. Then, all the images of RGB are made uniform in optical path length (the focal distance of an optical image). FIG. 7 is a structural diagram showing this embodiment, and in FIG. 7, the same signs as those in FIG. 5 indicate like members, and the details of the liquid-crystal display unit are the same as those in FIG. 5.

As shown in FIG. 7, the entire integrated liquid-crystal panels 216 to 218 are immersed in a coolant. The coolant exists in a region indicated by a dotted line 241. The coolant need be made of a material high in refractive index as well as translucent property. In the region 241, in at least portions where a light beam comes in or goes out, a window need be formed with a translucent material. Also, the liquid-crystal cell need be sufficiently sealed so that the coolant is prevented from entering within the liquid-crystal cell.

Specifically, it is preferable to use as the coolant an inactive material represented by a fluorine liquid from the viewpoint of shielding the liquid-crystal cell so that moisture is prevented from entering within the liquid-crystal cell from the exterior. Also, although not shown in FIG. 7, a heat radiator made of an appropriate material may be disposed in order to cool the coolant existing in the region 241.

Figure 8:
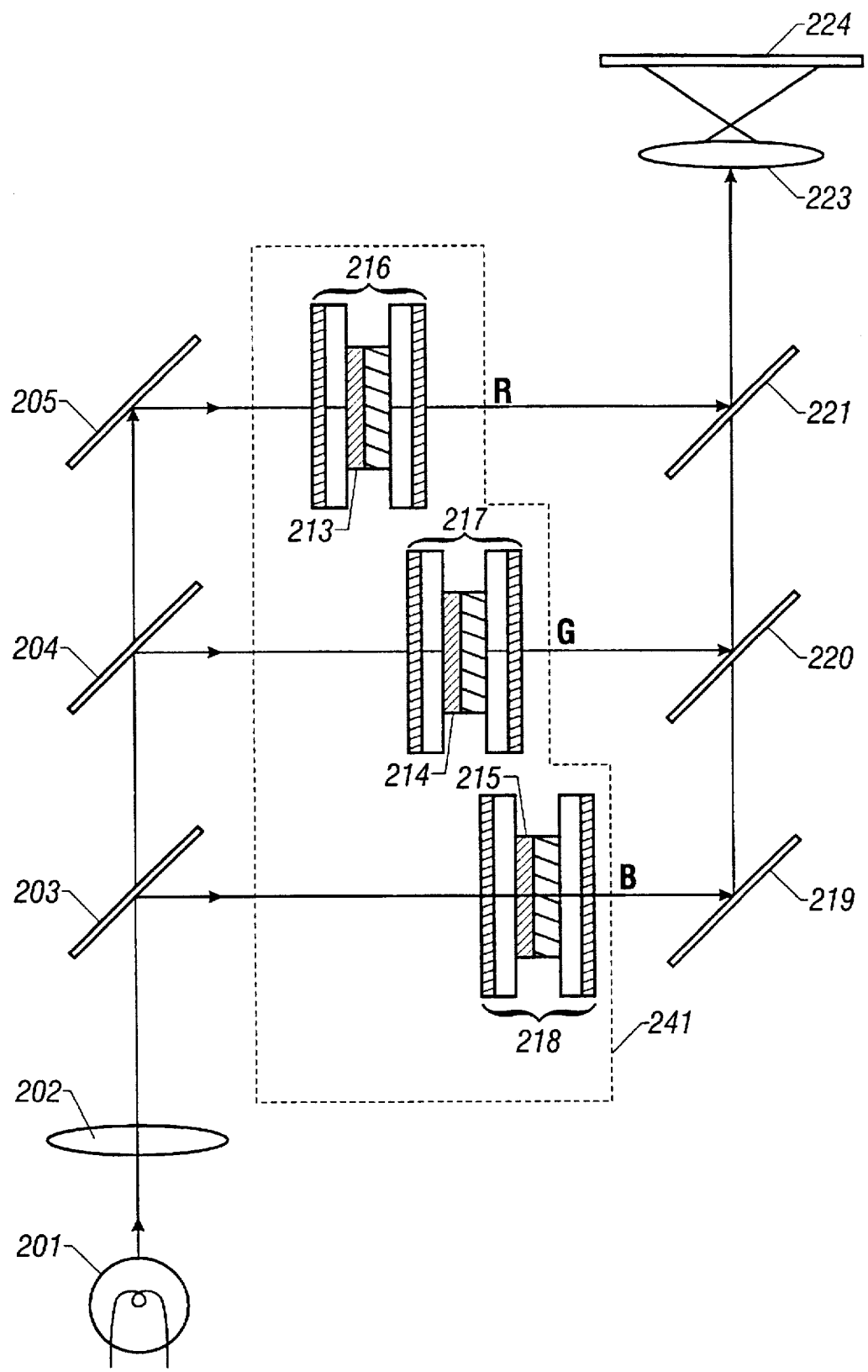
FIG. 8 is a schematic diagram for explaining the operation of a coolant for correcting an optical path length.

Also, the coolant filled in the region 241 has an operation of correcting the optical path. Since the focal distances of the images that pass through that coolant are shortened in accordance with the refractive index of the coolant so that the light outputted from the liquid-crystal panels 216 to 218 are finally focussed (imaged) at the same position. As shown in FIG. 7, since the respective spacial distances of from the liquid-crystal panels 216 to 218 to a projection lens 119 are prolonged in order, the optical path length of the R image that penetrates the liquid-crystal panel 216 progresses in the coolant is set to the shortest, and the optical path length of the B image that penetrates the liquid-crystal panel 218 progresses in the coolant is set to the longest. With this arrangement, as schematically shown in FIG. 8, the optical path lengths of from the liquid-crystal panels 216 to 218 to the projection lens 223 are corrected, respectively, so that the focal positions of the RGB images from the liquid-crystal panels 216 to 218, which arrive to the projection lens 119, can be made to coincide with each other.

Hence, the images of RGB are synthesized at a stage where they are incident to the projection lens 223, and its synthesized image is projected on a screen 120 or an appropriate projection face by the projection lens 223 so as to be formed there. Because the images of RGB are synthesized at the stage where they are incident to the projection lens 223, a clear image without shifting can be displayed by changing the focal point of the projection lens 223 even though a distance to the projection face is changed or the projection image is changed in size.

It should be noted that the accuracy of making the focal positions of the respective images coincide with each other may fall within a predetermined range in accordance with a required image quality. Also, in FIG. 7, the lens 102 and the projection lens 119 are shown as if they is formed of a single lens. However, the lens 102 and the projection lens 119 may be of a more complicated optical system depending on a required image quality.

In this embodiment, since the coincidence of the optical axes and the focussing are unnecessary, there is required no complicated optical adjustment process. This means that high productivity is obtained, and is very useful from the industrial viewpoint.

In this embodiment, there is used the TFT active matrix type liquid-crystal display unit (liquid-crystal panel) using the TN type liquid crystal. However, the structure of the liquid-crystal panel may be of the passive matrix type or the active matrix type using the MIM type element. A liquid-crystal material may be a ferroelectric liquid crystal or a dispersed liquid crystal.

(Seventh Embodiment)

Figure 9:
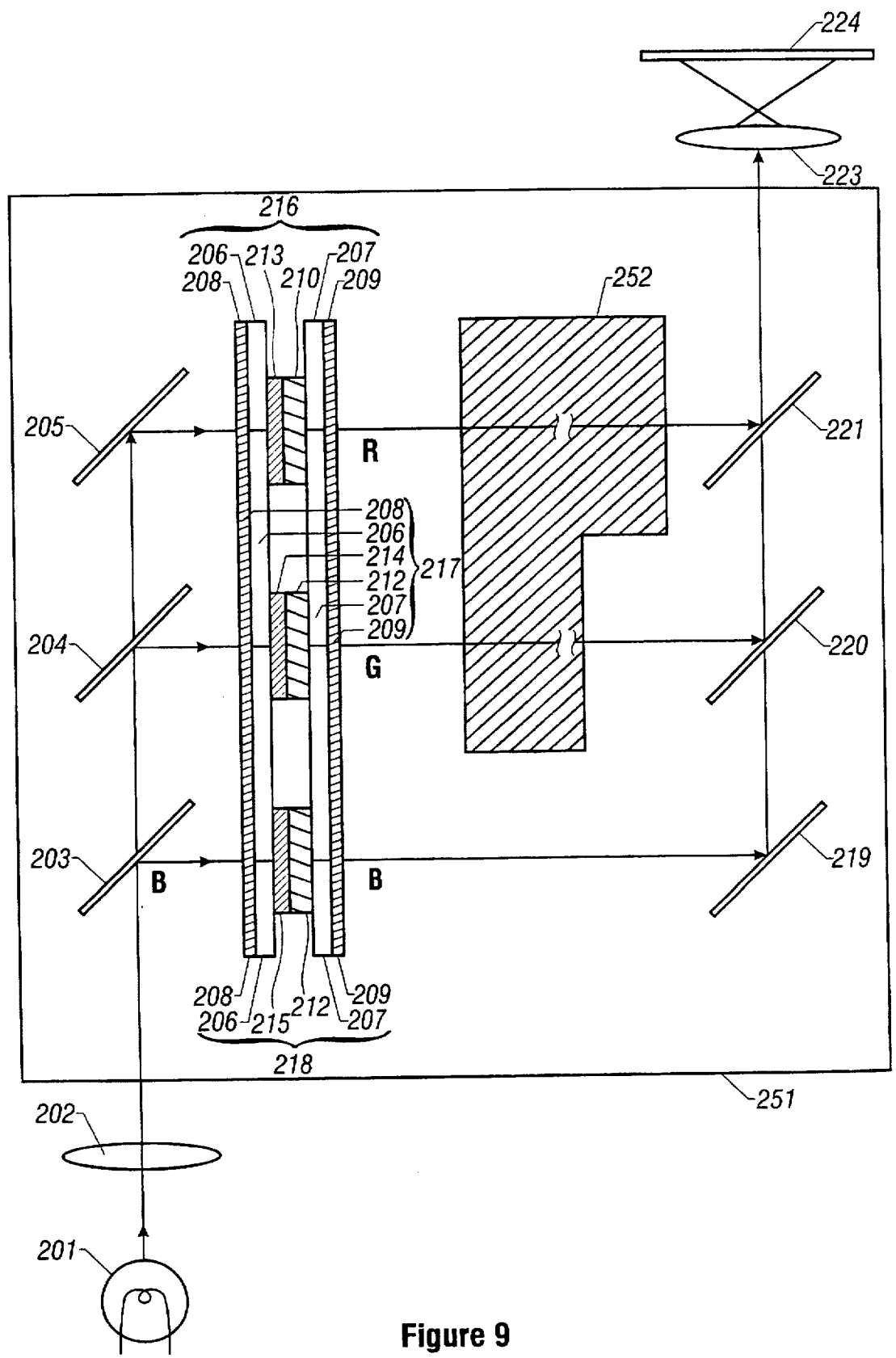
FIG. 9 is a structural diagram showing a projection type liquid-crystal display unit in accordance with a seventh embodiment of the present invention.

A seventh embodiment is characterized in that, in addition to the liquid-crystal panels, dichroic mirrors and so on, which constitute an optical system, are immersed in a coolant. FIG. 9 shows a schematic structure of this embodiment. In FIG. 9, the same signs as those in FIG. 5 represent like members.

In FIG. 9, reference numeral 251 denotes a casing which is filled with a coolant. Semi-transparent mirrors 203 to 205, the respective liquid-crystal panels 216 to 218 for RGB, a mirror 219 and semi-transparent mirrors 220, 221 are received in the casing 131 in a liquid-immersed state. A portion indicated by reference numeral 252 is a hollow which is filled with not liquid but air (or inactive gas). With such a structure, the focal distances of images from the respective liquid-crystal panels 216 to 218 are changed, thereby making the focal positions of the respective images of RGB that pass through a projection lens 223 coincide with each other.

Because the image is allowed to pass through hollow portion 252, the focal distance of the image is prolonged in accordance with the passing distance. This is because the refractive index of air or inactive gas is lower than that of liquid. Hence, the existing positions of the liquid-crystal panels 216 and 217 are apparently far from the projection lens 223 in accordance with the passing distances of the hollow portion 702 (the passing distances of images from the respective liquid-crystal panels). That is, the optical distances between the liquid-crystal panel 217 and the projection lens 223 is prolonged. Further, the optical distances between the liquid-crystal panel 216 and the projection lens 223 is further prolonged.

With such an arrangement, the optical distances of from the respective liquid-crystal panels to the projection lens 223 can be made substantially uniform. Then, on the projection lens 223, the focal positions of the respective images of RGB can be made to coincide with each other.

With the application of the structure shown in FIG. 9, since a great portion of the optical system can be immersed in the coolant, for example, dust can be prevented from being attached onto the surfaces of a variety of mirrors. Also, the cooling effect can be enhanced as a whole.

Although being not apparent from FIG. 9, the casing 251 and portions of the hollow portion 252 where the light (image) penetrates need be made of a translucent material.

With the application of the above-mentioned fourth to sixth embodiments, all the following required items can be satisfied.

(1) The overall structure is downsized as much as possible (simplified).

(2) The structural elements are reduced in number.

(3) The structure is so designed as to restrain the rising of temperature.

(4) The structure are so designed that the respective optical axes of RGB images readily coincide with each other.

(5) The structure is so designed that the lengths of optical paths for RGB are made uniform.

That is, the respective liquid-crystal panels corresponding to RGB are integrated together as shown by reference numerals 111, 113 and 114 in FIG. 3, thereby being realizing the required items (1), (2) and (4).

Also, since the liquid-crystal panels are integrated together, and cooling means for the liquid-crystal panels and means for making the focal positions of the respective images of RGB coincide with each other are constituted using liquid, the required items (1), (2), (3) and (5) can be realized.

Further, since the integrated structure are cooled with liquid, a simple structure can be realized and a cooling efficiency can be enhanced. As a result, a lamp high in the intensity of light emission can be used, and an image having a high luminance can be displayed.

(Eighth Embodiment)

An eighth embodiment relates to a structure in which the integrated RGB liquid-crystal panels 216 to 218 shown in the fifth to seventh embodiments and the peripheral circuits that drive those liquid-crystal panels are integrated. This structure is so arranged that three liquid-crystal panel functions are built in one liquid-crystal panel, and a pair of glass substrates that constitute a panel and a polarization plate are commonly used.

Figure 11:
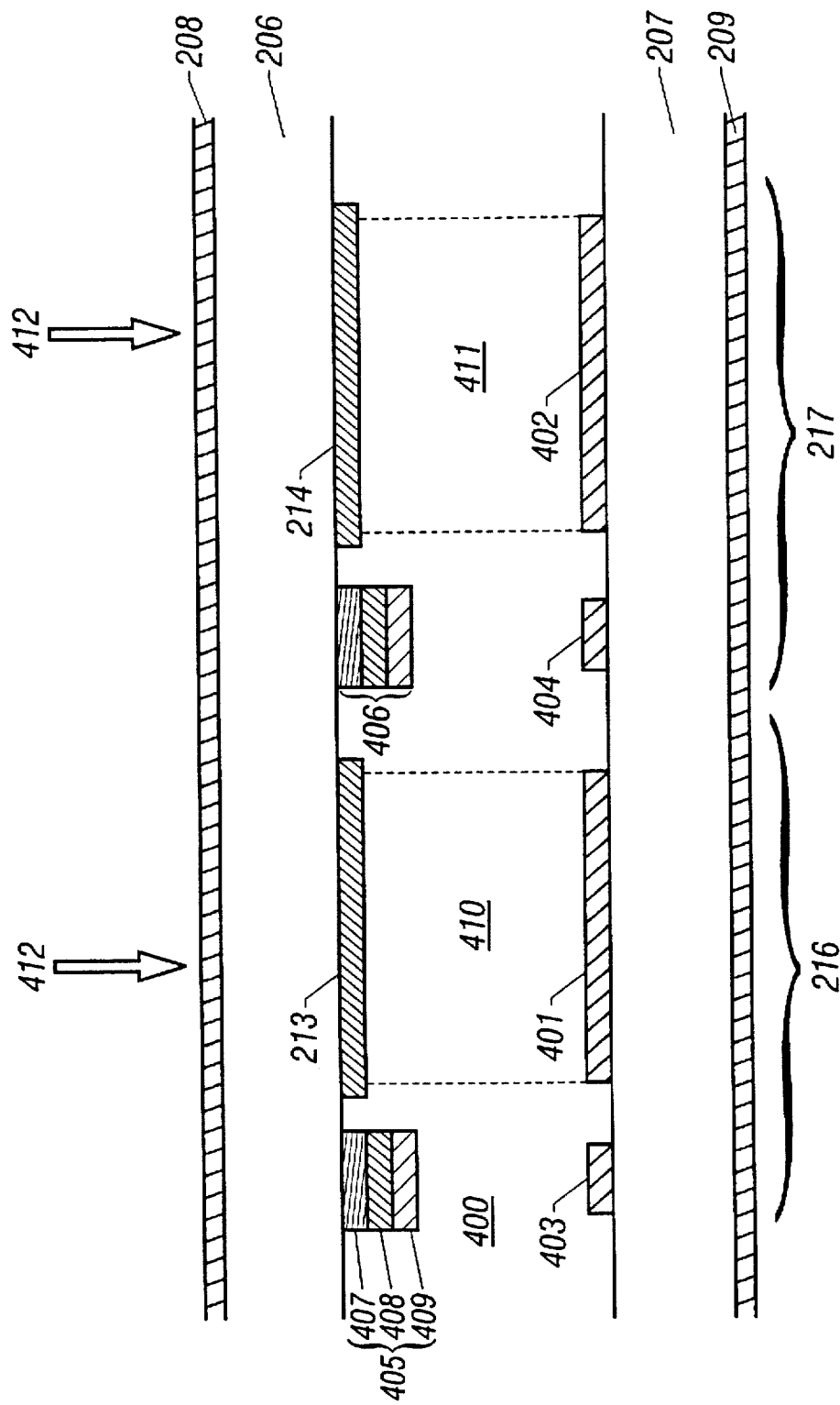
FIG. 11 is a cross-sectional view showing a liquid-crystal panel in accordance with an eighth embodiment of the present invention.

FIG. 11 is a cross-sectional view showing this embodiment, in which the same signs as those in FIGS. 7 and 9 represent like members. The front view of FIG. 11 corresponds to FIG. 10. FIG. 11 is an enlarged view showing an liquid-crystal panel 216 for R and a liquid-crystal panel 217 for G. On a glass substrate 206 are provided pixel sections 401 and 402 for executing display, and signal line drive circuits 403 and 404 for driving the pixel sections 401 and 402. On the glass substrate 207, there are provided an R color filter 213 and a G color filter 214 so that they are opposite to the pixel sections 401 and 402, and light shield masks 405 and 406 so that they are opposite to signal line drive circuits 403 and 404. The light shield masks 405 and 406 are formed by piling the R color filter 407, the G color filter 408 and the B color filter 409 on one another.

The reason why the light shield masks are formed by piling the respective color filters for RGB on one another is as follows: As a result of investigating a white light which has been irradiated onto the respective color filters for RGB, the overlapped portion of spectrum of the respective translucent light beams hardly exists. In other words, when the white light passes through those three color filters for RGB, the light does not finally pass therethrough.

What is shown in FIG. 11 is that a light shield film for the peripheral circuits is formed using color filters for making the respective colors of RGB, applying the above-mentioned principle. The peripheral circuit is comprised of thin-film transistors which are required to conduct a high-speed operation and adversely affected by the application of a light to the active layer. In other words, with the application of a light, the operation characteristics are changed, and the failure of operation is liable to occur. Hence, as shown in FIG. 11, it is important to arrange the light shield masks (light shield films) 405 and 406.

Also, because the light shield mask is formed using the color filters for RGB, in particular, the handling of forming the mask using the light shield mask material can be omitted. This is important for reduction of the manufacture costs.

Furthermore, a liquid crystal 400 is held between the glass substrates 206 and 207. It should be noted that, although the liquid crystal 400 is filled between the substrates 206 and 207, what in fact contributes to the operation is the liquid crystal 400 which is within the regions 410 and 411 in contact with the pixel sections 401 and 402. Also, polarization plates 208 and 209 are bonded to the outer surfaces of the glass substrates 206 and 207.

For display, the white light 412 outgoing from the light source is made to coincide with each other in polarizing face through a polarizing plate 208, penetrate the glass substrate 206, and then penetrate the R color filter 213 and the G color filter 214, resulting in a red light beam and a green light beam, respectively.

In this situation, the signal line drive circuits 403 and 404, and the scanning ling drive circuit not shown allow the charges stored in the pixel electrodes of the pixel sections 401 and 402 to be controlled. The orientation of the liquid crystal 400 within the regions 410 and 411 is changed in correspondence with the charges stored in those pixel electrodes. For that reason, the red light beam and the green light beam that penetrate the R color filter 213 and the G color filter 214 are subjected to an optical modulation by passing the liquid crystal 400 within the regions 410 and 411, the glass substrate 207 and the polarization plate 208, thereby forming an R image and a G image. Also, a B image is formed in the same manner.

(Ninth Embodiment)

A ninth embodiment shows another example of the structure of a liquid-crystal panel. In general, light shield means called "black matrix" is required for the liquid-crystal panel. This is provided for preventing display from becoming unclear due to a delay of a liquid-crystal response on the peripheral boundary of pixels. Also, the black matrix serves as light shield of a thin-film transistor disposed in the pixels.

Figure 12:
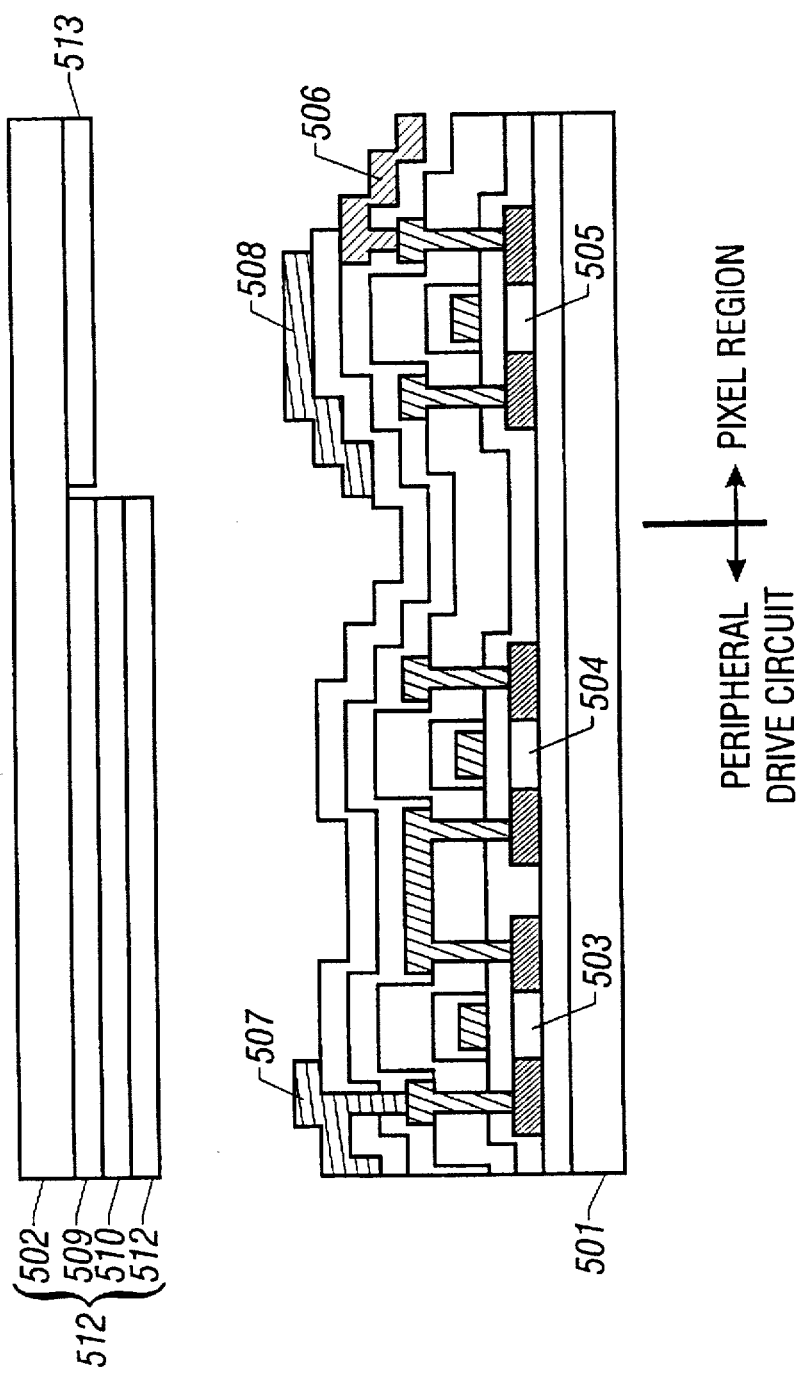
FIG. 12 is a cross-sectional view showing a liquid-crystal panel in accordance with a ninth embodiment of the present invention.

This embodiment is characterized in that the wiring of thin-film transistors in a peripheral circuit is conducted using a metal material that constitutes the black matrix. FIG. 12 shows the structure of a liquid-crystal panel in accordance with this embodiment. In the figure, there is shown the structure of a part of one liquid-crystal panel (a liquid-crystal panel for R, G or B).

In the structure shown in FIG. 12, liquid crystal not shown is held between opposed substrates 501 and 502. On the substrate 501 are formed complementary thin-film transistors 503 and 504 of a peripheral circuit, in particular, a portion which is called "a drive circuit", and a thin-film transistor 505 disposed in a pixel region. The drain of the thin-film transistor 505 is connected with a pixel electrode 506.

Also, in this embodiment, the material of a wiring 507 of the thin-film transistor 501 that constitutes a drive circuit is the same as the material of a black matrix 508 (in the figure, a function portion is shown as a light shield film that shields the thin-film transistor 505 in the pixel region from a light). The material of the wiring 507 having a light shield property may be titanium or chrome. For that reason, the third-layer wiring 507 and the black matrix 508 of the thin-film transistor 503 can be formed in the same process. Then, the elements can be integrated to a higher degree.

In the structure shown in FIG. 12, there is formed, on the substrate 502, a light shield film 512 where color filters 509 to 511 of three colors consisting of RGB are piled on one another in a region which is opposite to the drive circuit. The light shield film 512 shields the peripheral drive circuit from a light. Moreover, in the pixel region, there is formed a color filter 513 of a single color for obtaining a desired color light. The color of the color filter 513 may be selected appropriately from any one of RGB.

Because the light shield film 512 is formed of the color filters 509 to 511, the light shield film 512 and the color filter 513 can be formed in the same process.

(Tenth Embodiment)

Figure 13:
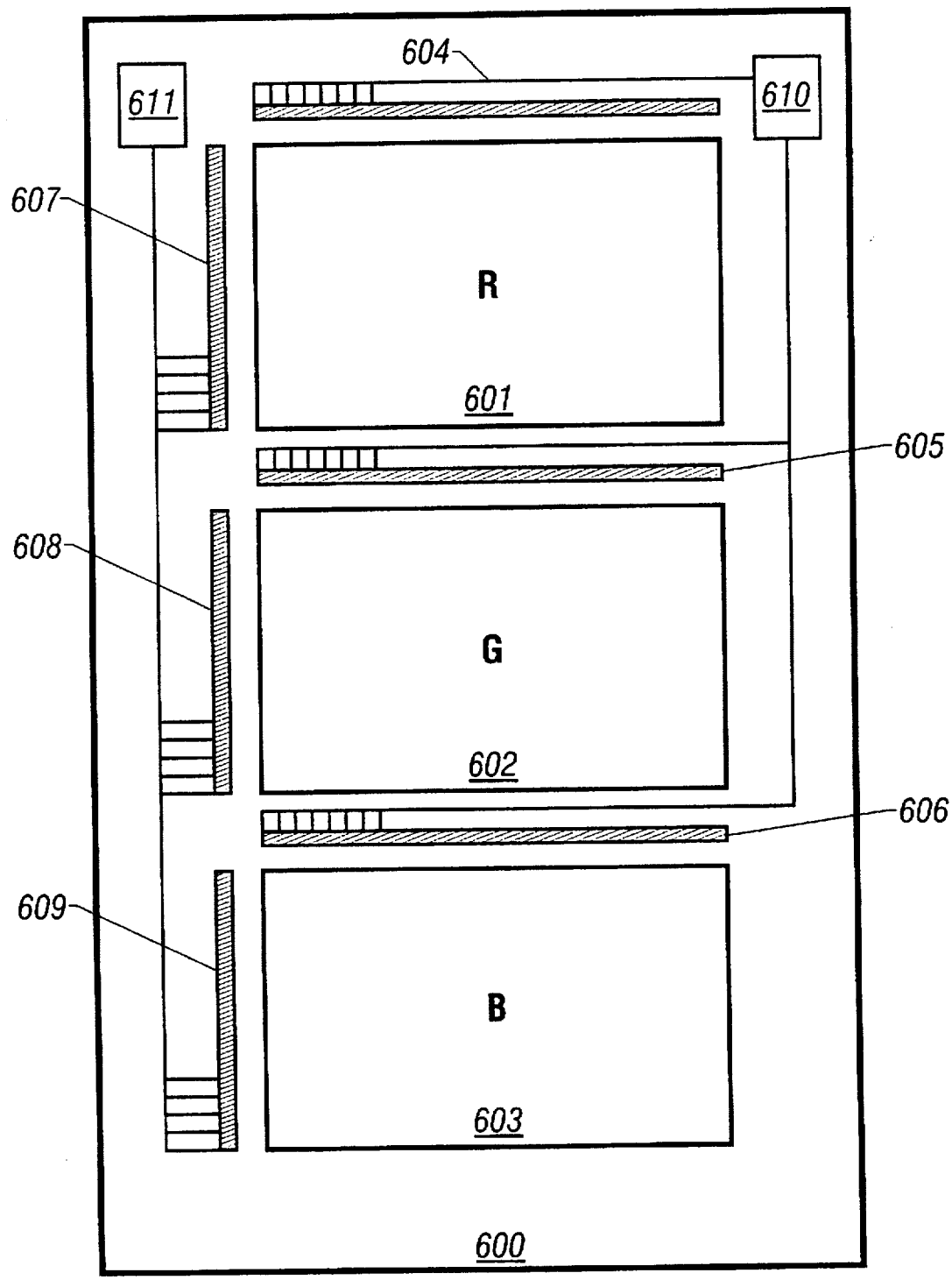
FIG. 13 is a front view showing a liquid-crystal panel in accordance with a tenth embodiment of the present invention.

A tenth embodiment relates to a drive circuit of the projection type active matrix liquid-crystal display unit as described in the above-mentioned first to ninth embodiments, and the drive circuit of this embodiment is a digital decoder type drive circuit. FIG. 13 is a schematic diagram showing the integrated liquid-crystal panels for RGB in accordance with this embodiment. In the figure, pixel sections 601 to 603 are formed on the same glass substrate 600, for forming the respective images of RGB where three liquid-crystal panels for the formation of the respective images of RGB are formed. The pixel sections 601 to 603 are connected with signal line drive circuits 604 to 606 through signal lines not shown, respectively, and also connected with scanning line drive circuits 607 to 609 through scanning lines not shown, respectively. On the pixel sections 601 to 603 are disposed thin-film transistors for driving a liquid-crystal cell for each pixel, and a source electrode of the thin-film transistor is connected with the signal lines and a gate electrode thereof is connected with the scanning lines.

Also, a necessary signal is supplied to the signal line drive circuits 605 to 607 from one synchronous counter 610, whereas a necessary signal is supplied to the scanning line drive circuits 608 to 610 from one synchronous counter 611.

The reason why the synchronous counters 610 and 611 may be provided for the signal line drive circuits 604 to 606 and the scanning line drive circuits 607 to 609 for the liquid-crystal panels, respectively, is that the pixel sections 601 to 603 for RGB display the same image at the same time in the projection type liquid-crystal display unit.

Figure 14:
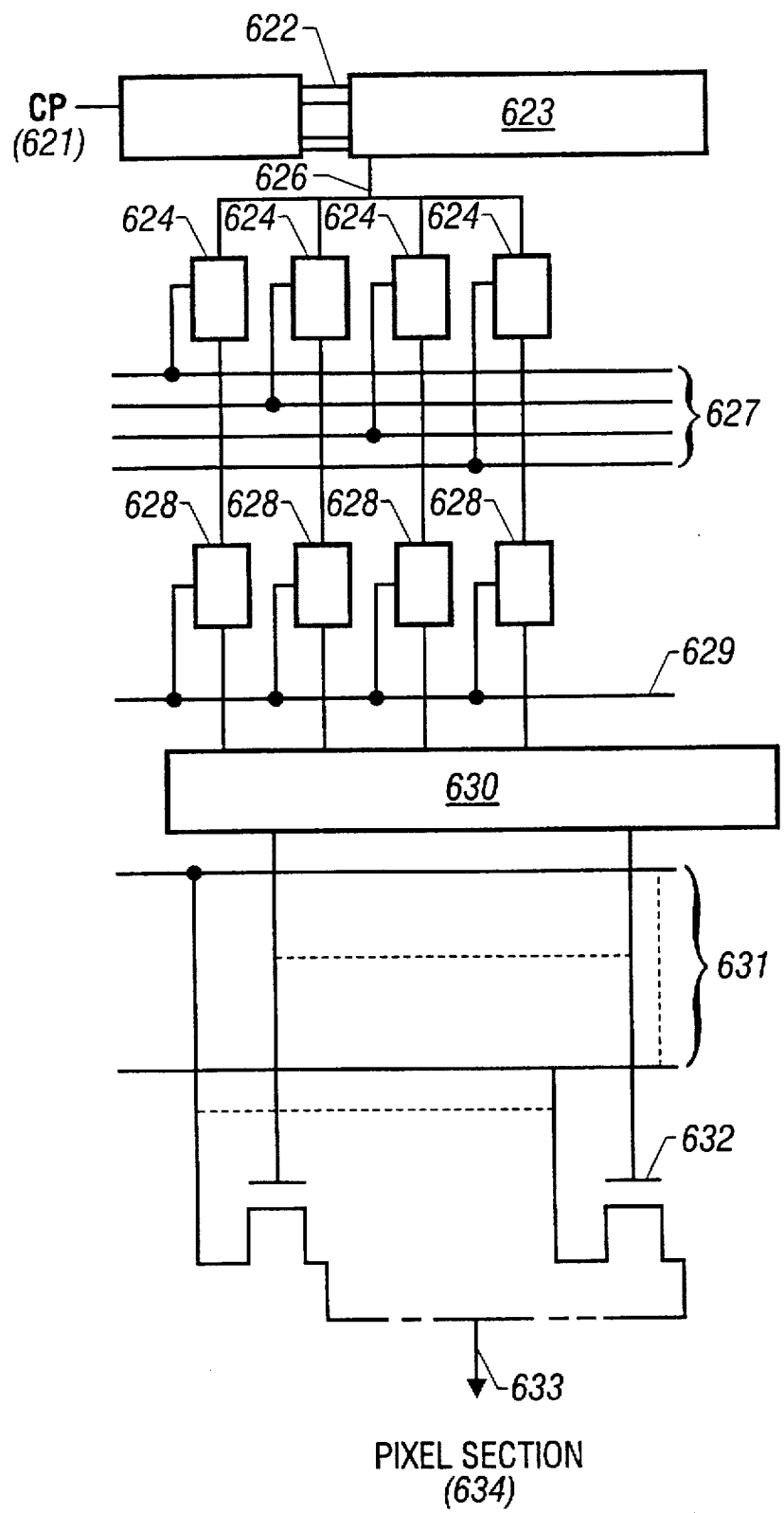
FIG. 14 is a block diagram showing a signal line drive circuit.

FIG. 14 shows the structure of the signal line drive circuits 604 to 606 in accordance with this embodiment. Here, one of the signal line drive circuits 604 to 606 will be described.

As shown in FIG. 14, the output of the synchronous counter 610 shown in FIG. 13 is connected to an address decoder 623 to which a plurality of JK type flip flop circuits are connected, through address lines 622, and the output of one JK type flip flop circuit of the address decoder 623 is connected to latch circuits 624 which is comprised of delay type flip flop circuits (D-type flip flop circuits) connected in parallel correspondingly to the number of bits of an image signal (tone signal).

Each D-type flip flop circuit of the latch circuit 624 is connected with a data signal line 627 different from other lines 627, and the output of each of the D-type flip flop circuits is connected with the D-type flip flop circuit of latch circuits 628, respectively. The latch circuits 628 input a latch pulse 629 from the common wiring, and their outputs are connected with a decoder 630. The outputs of the decoder 630 are connected to the gates of thin-film transistors forming analog switches 632.

Also, the source of the thin-film transistor of each analog switch 632 is connected to a wiring to which a tone signal 631 is inputted, the drain thereof is connected to a signal line 633, and a signal line 633 is connected to the source of a thin-film transistor not shown of the pixel section 634.

First, the synchronous counter 610 will be described.

Figure 15:
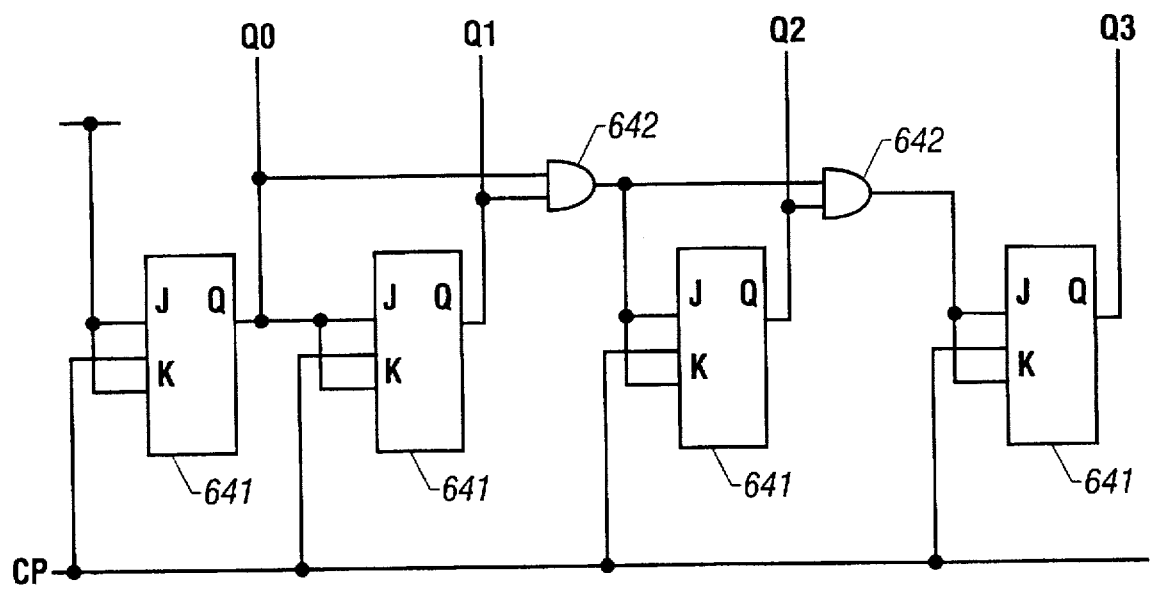
FIG. 15 is a block diagram showing a synchronous counter.

As shown in FIG. 15, in the synchronous counter 610, a plurality of JK type flip flop circuits 641 are connected in parallel to each other by the number of bits necessary for counting the signal line 633. In this example, because the pixel structure executes a single-color display of 500×500, 9 bits are necessary for input of the signal line drive circuit.

The clock terminals of the respective JK type flip flop circuits 641 are inputted with a clock pulse (CP) 621 at the same time. The output signals Q of the respective JK type flip flop circuits 241 are outputted to the latch circuits 624 as Q0, Q1, ... QN, and connected to the J and K terminals of the JK type flip flop circuit at the succeeding stage, respectively.

The synchronous counter 610 of the present invention gives a clock pulse 610 to the respective stages as an input signal without receiving the output of the JK type flip flop circuit 641 at the prestage as an input signal. Further, the synchronous counter 610 controls the JK type flip flop circuits, to thereby conduct an accurate counter without any time delay which is a drawback of the asynchronous counter.

Figure 16:
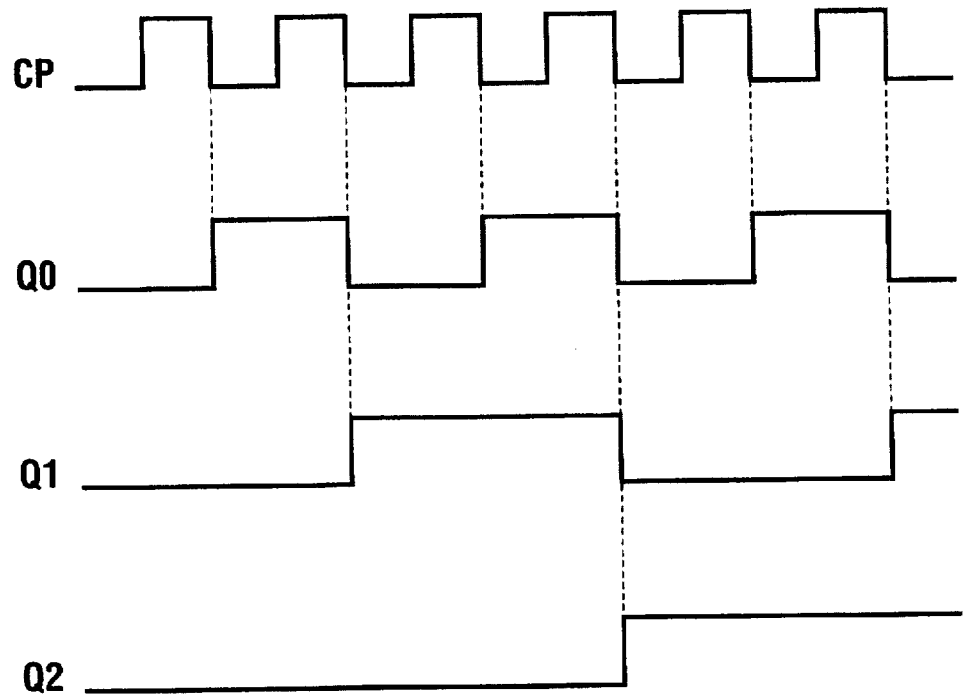
FIG. 16 is a waveform diagram showing a clock pulse and an output signal of the synchronous counter.

The operation of this circuit will be described. FIG. 16 shows the waveform diagram of the output signals Q0 to Q2 of the JK type flip flop circuits 641.

In the JK type flip flop circuit of the Qn-stage, when an output signal Of $Q_{n-1}$ is to be held, both of the J and K inputs need receive an L signal, and when the output signal of $Q_{n-1}$ is forcedly inverted in the output of the $Q_n$-stage, both of the J and K inputs need receive an H signal.

For that reason, in the first JK type flip flop circuit 641, both the J and K input are arranged to receive the H signal so that the output Q0 is inverted every time the clock pulse 600 is inputted thereto.

In the second JK type flip flop circuit 641, it is required that, every time two clock pulses 621 are inputted thereto, the output Q1 is inverted, and in other cases, the signal is held as it is. For that reason, the output signal Q0 of the previous JK type flip flop circuit is used as the J and K inputs. Hence, without the J and K inputs being fixed to H from the first, a signal held by itself is inverted after the first output become H.

The third and subsequent JK type flip flop circuits are controlled as stated below. As shown in FIG. 16, it is found that the output $Q_n$ of the n-stage JK type flip flop circuit is inverted (that is, J, K=H) when all the outputs Q0, Q1, ..., $Q_{n-1}$ of the JK type flip flop circuits 641 upstream of the (n-1) stage are H. Therefore, if the AND of the outputs Q0, Q1, ..., $Q_{n-1}$ are the J and K input signals of the n-stage JK type flip flop circuit 641, when all the Q0, Q1, ..., $Q_{n-1}$ are H, the J and K inputs of the n-stage JK type flip flop 641 become H, so that the output of the n-stage JK type flip flop circuit is inverted, and in other cases, the signal is held as it is.

In the signal line drive circuit shown in FIG. 14, when the clock pulse 621 is inputted to the synchronous counter 610 as an input signal, the synchronous counter 610 counts the number of pulses of the clock pulse 621, and the count result is inputted to the address decoder 623 through the address line 622 as an address signal. Then, a pixel to be displayed is selected as a binary digital signal.

Hence, the address line 622 does not exist before the synchronous clock counter 610, and only one wiring for the clock pulse 600 is drawn out to the external connection terminal from the synchronous clock counter 610. In other words, as shown in FIG. 13, the input terminals of the signal line drive circuits 604 to 606 are connected to the synchronous counter 610 through one wiring.

The address signal outputted from the address decoder 623 is inputted to the latch circuits 624 consisting of the D-type flip flop circuit as a latch pulse signal 626. The latch circuits 624 receive a tone signal supplied from the data signal line 627 in accordance with the timing of the latch pulse 626, and reserve its result therein as a logic.

The tone signals selected by the latch circuits 624 are inputted to the D-type flip flop circuits of the latch circuits 628 which are connected in series to the D-type flip flop circuits 624, respectively.

The latch circuits 628 output signals which are synchronous with one scanning timing of the display unit to the decoder 630 in accordance with the latch pulse 629 taken from the external. The decoder 630 selects the tone of image data to be displayed on the basis of an output signal from the latch circuits 628, and outputs a signal representative of tone data to the gate side of the analog switches 912 having a predetermined address.

Since the sources of the analog switches 632 are connected to the tone signal lines 631 having a potential into which a potential corresponding to a tone is resistor-divided, the tone potential selected by the analog switches 632 is outputted to the liquid-crystal cell of the pixel section 634 to be displayed through the signal line 633.

If necessary, the tone potential may be amplified by the amplifier circuit before being outputted to the pixel.

Subsequently, a bidirectional drive will be described.

In the case of conducting the bidirectional drive, an up/down counter which is capable of selecting whether operation is conducted at the rising of a clock signal or at the falling thereof may be used instead of the synchronous counter 610.

Figure 17:
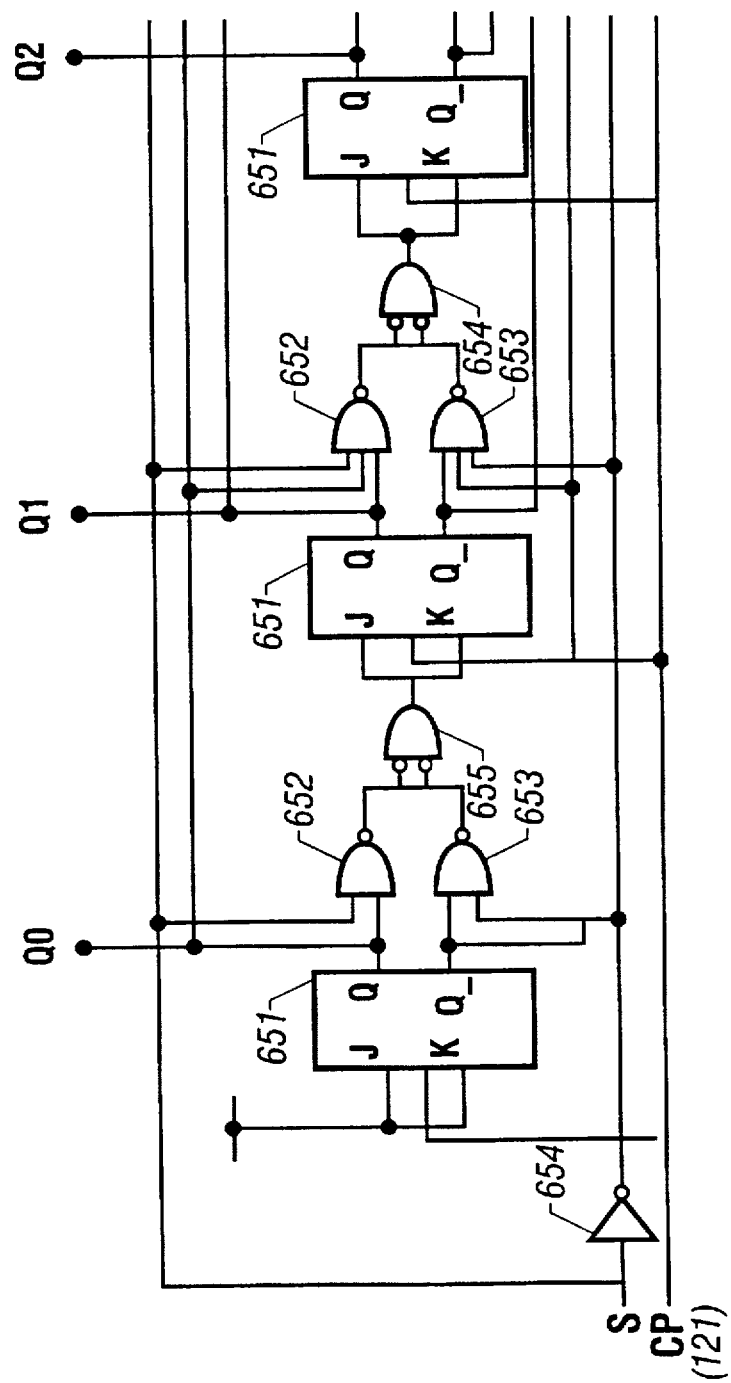
FIG. 17 is a block diagram showing an up/down counter.

FIG. 17 shows a logic circuit diagram of the up/down counter. In the up/down counter, the n- JK type flip flop circuits 651 are connected only the number of bits necessary for counting the signal line 633.

The clock terminal of the JK type flip flop circuit 651 at each stage is inputted with a clock pulse (CP) 621 at the same time. The outputs Q of the JK type flip flop circuits 651 at the respective stages are connected with NAND circuits 652 as Q0, Q1, ... Qn, respectively. On the other hand, the outputs Q-0, Q-1, ... Q-n are connected to NAND circuits 653, and also connected to NAND circuits 652 connected to the JK type flip flop circuit 651 at the succeeding stage. The NAND circuits 653 input a switching signal s from the changeover switch, whereas the NAND circuits 653 input the switching signal which has been inverted by the invertor circuit. The outputs of the NAND circuits 652 and 653 are connected to the J and K inputs of the JK type flip flop circuit 651 at the succeeding stage through an invertor circuit not shown and an OR circuit 655.

When a switching signal s of a changeover switch of the up/down counter shown in FIG. 17 is set to H, the counter functions as an up counter and operates at the falling of a clock, whereas, when the switching signal s is set to L, the counter functions as a down counter and operates at the rising of a clock.

Figure 18:
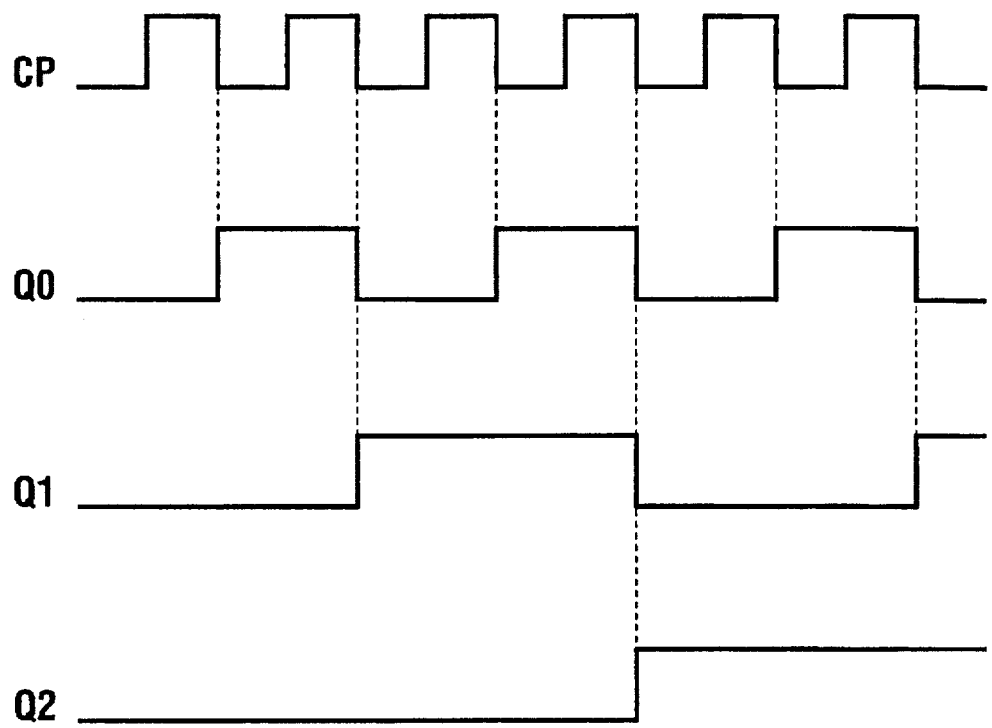
FIG. 18 is a waveform diagram showing a clock pulse and an output signal of an up/down counter.

The circuit operation of the up/down counter will be described below. FIG. 18 shows a waveform diagram of the outputs Q0, Q1 and Q2 of the JK type flip flop circuit 651.

In the first JK type flip flop circuit 651, both the J and K input are fixed to H so that the output Q0 is inverted every time the clock pulse 621 is inputted thereto, similarly to the synchronous counter 610.

Then, the outputs of the second and succeeding JK type flip flop circuits 651 will be described.

First, in the NAND circuits 652, the NANDs of the switching signal s and Q0, A1, ... $Q_{n-1}$ are executed. In the NAND circuits 653, the NANDs of the inverted switching signal s and the outputs Q0, Q1, ... $Q_{n-1}$ of the previous JK type flip flop circuit 651 are executed. The outputs of the NAND circuits 652 and 653 are ORed in OR circuits 655 through an invertor not shown, and its result is inputted to the J and K inputs of the second and succeeding JK type flip flop circuits 651.

The circuit operation when the switching signal S for changing over the up/down is set to H will be described below. In the n-stage JK type flip flop circuit 651, the output of the NAND circuit 652 upstream thereof becomes L when $Q_{n-1}$=H, and H when $Q_{n-1}$=L. In other words, because H is fixedly inputted as a switching signal, the output of NAND circuit 652 is changed in accordance with the level f $Q_{n-1}$.

On the contrary, because the inverted switching signal S=L is inputted to the NAND circuit 653 as a fixed signal, the output of the NAND circuit 653 is kept H not depending on the level of $Q_{n-1}$.

For that reason, a signal inputted to the OR circuit 654 through an invertor not shown becomes H and L when $Q_{n-1}$=H, and because the output of the OR circuit 655 becomes H, the output Qn of the n-stage JK type flip flop circuit is inverted. On the other hand, when $Q_{n-1}$=L, a signal inputted to the OR circuit 655 becomes L and L, and because the output of the OR circuit 655 becomes L, the output Qn of the n-stage JK type flip flop circuit 651 is held.

In other words, as is apparent from the waveform diagram shown in FIG. 18, when the switching signal S for changing over the up/down is set to H, the circuit shown in FIG. 17 functions as an up counter. When all of Q0, Q1, ... $Q_{n-1}$ are H, the inputs J and K of the JK type flip flop circuit 651 become H so that the signal is inverted, and when at least one of Q0, Q1, ... $Q_{n-1}$ is L, Qn becomes in a signal holding state.

The circuit operation when the input S of the up/down changeover switch is L will be described below. In this example, the circuit shown in FIG. 17 functions as a down counter. FIG. 18 shows a waveform diagram of the outputs Q0, Q1 and Q2 of the JK type flip flop circuit 651.

In the n-stage JK type flip flop circuit 651, because the NAND circuit 652 connected to the prestage is inputted with a fixed signal of an L state, the output Qn is always kept H not depending on the level of $Q_{n-1}$.

On the contrary, because the NAND circuit 653 is inputted with the inverse signal of switching signal s as a fixed signal of the H state, the output of the NAND circuit 653 becomes L when $Q_{n-1}$=H, and H when $Q_{n-1}$=L, which changes depending on the level of $Q_{n-1}$.

Hence, because signals inputted to the OR circuit 655 through the invertor become L and L when $Q_{n-1}$=H, the output of the OR circuit 655 becomes L. As a result, the output Qn of the n-stage JK type flip flop circuit 651 is held. On the other hand, because the input signals of the OR circuit 65 become H and L when $Q_{n-1}$=L, its output signal 7 becomes H, and the output Qn of the n-stage JK type flip flop circuit 651 is inverted.

Figure 19:
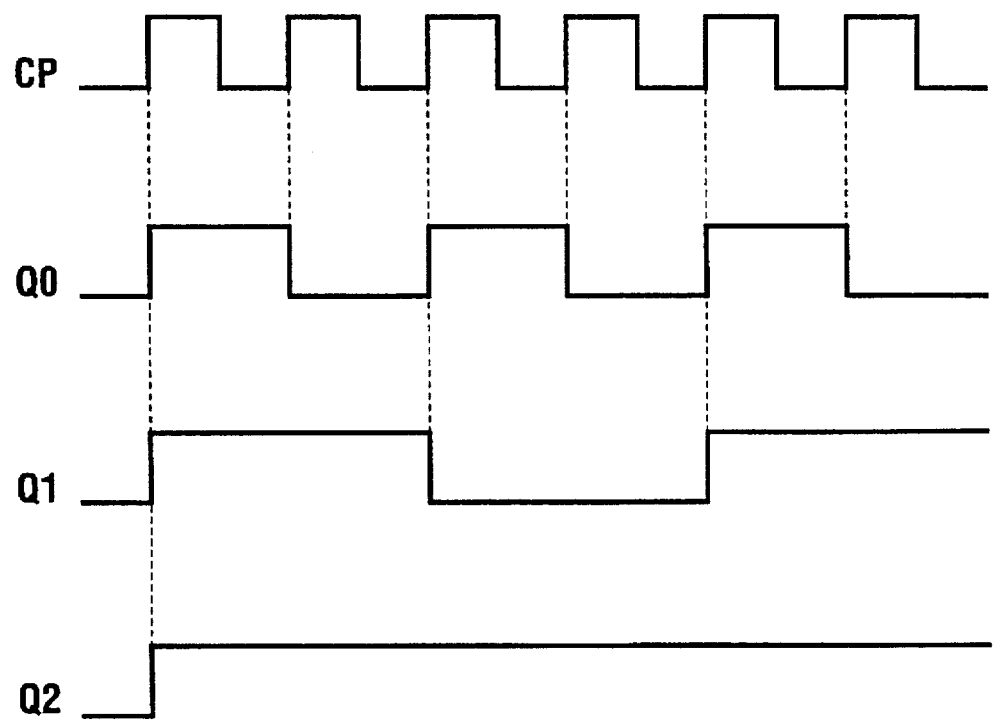
FIG. 19 is a waveform diagram showing a clock pulse and an output signal of an up/down counter.

As shown in FIG. 19, when the switching signal S is set to L, it functions as a down counter. Therefore, when all of Q0, Q1, ... $Q_{n-1}$ are L, J and K become H, and Qn is inverted. When at least one of Q0, Q1, ... $Q_{n-1}$ is H, Qn is held as it is.

In the above-mentioned manner, the direction of selecting the signal line can be extremely readily changed over by the up/down changeover switch.

For example, the direction of selecting the signal line can be changed over from a state where it is shifted from the left side to the right side to a state where it is shifted from the right side to the left side. As a result, the image the right and left of which are inverted can be readily obtained.

Figure 20:
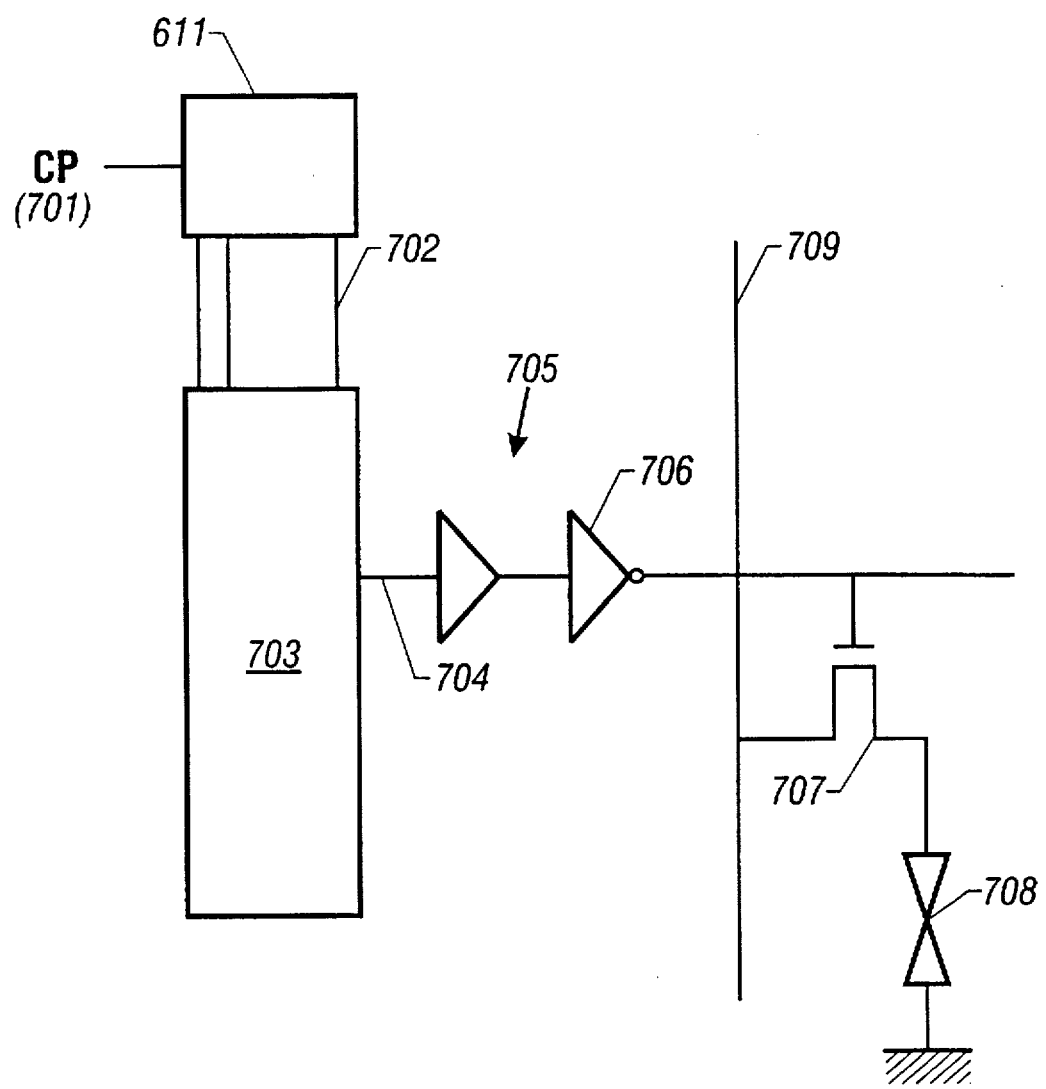
FIG. 20 is a block diagram showing a scanning line drive circuit.

Subsequently, FIG. 20 shows a block diagram of the scanning line drive circuits 607 to 609 in accordance with this embodiment. In this example, the structure of the scanning line drive circuits 607 to 609 of one liquid-crystal panel will be described.

In this example, even in the scanning line drive circuit, the output of the synchronous clock counter 611 is inputted to the address decoder circuit 703 through the address line 702 as an address signal.

In the scanning line drive circuit shown in FIG. 20, when the clock pulse 701 is inputted to the synchronous counter 611 as an input signal, the synchronous counter 611 counts the number of pulses of the clock pulse 701, and the count result is inputted to the address decoder 703 through the address line 702 as an address signal.

Hence, the address line 702 does not exist before the synchronous clock counter 611, and only one wiring for the clock pulse 701 is drawn out to the external connection terminal from the synchronous clock counter 611. In other words, as shown in FIG. 13, the input terminals of the signal line drive circuits 607 to 609 are connected to the synchronous counter 611 through one wiring.

The address decoder 703 outputs a signal to the scanning line 704 of an address specified by the address signal. The outputted signal is amplified by a level shifter 705 and a buffer 706 and inputted to the gate electrode of the thin-film transistor 707 connected to one scanning line 704. The thin-film transistor 707 controls the storage/discharge of charges in the liquid-crystal cell 708 of the pixel section in accordance with the input from the scanning lines 704 and the signal lines 709.

Similarly, in this scanning line drive circuit, the synchronous clock counter 611 is provided as an up/down counter shown in FIG. 17, thereby being capable of changing over the direction of selecting the scanning line appropriately. In this case, the up and down of a display image can be inverted by changing over the selection direction.

In the liquid-crystal display unit having the structure of the invention as described above, even though display cannot be executed because one signal line is defective, a good display state can be obtained without other signal lines being adversely affected by the defective signal line.

Also, because only wirings for a clock pulse and for inputting the clock pulse to the clock counter are extended in the periphery of the drive circuit without any wiring of the address signal line, the connection region of the address signal line becomes unnecessary, and the invention is proper for a downsized display unit.

(Eleventh Embodiment)

In the tenth embodiment, as shown in FIG. 13, the respective liquid-crystal panels 601 to 603 for RGB are provided with the scanning line drive circuits 604 to 606. However, two liquid-crystal panels can be driven by one scanning line drive circuit. This is because the liquid-crystal panels 601 to 602 for RGB display the same image at the same time.

Figure 21:
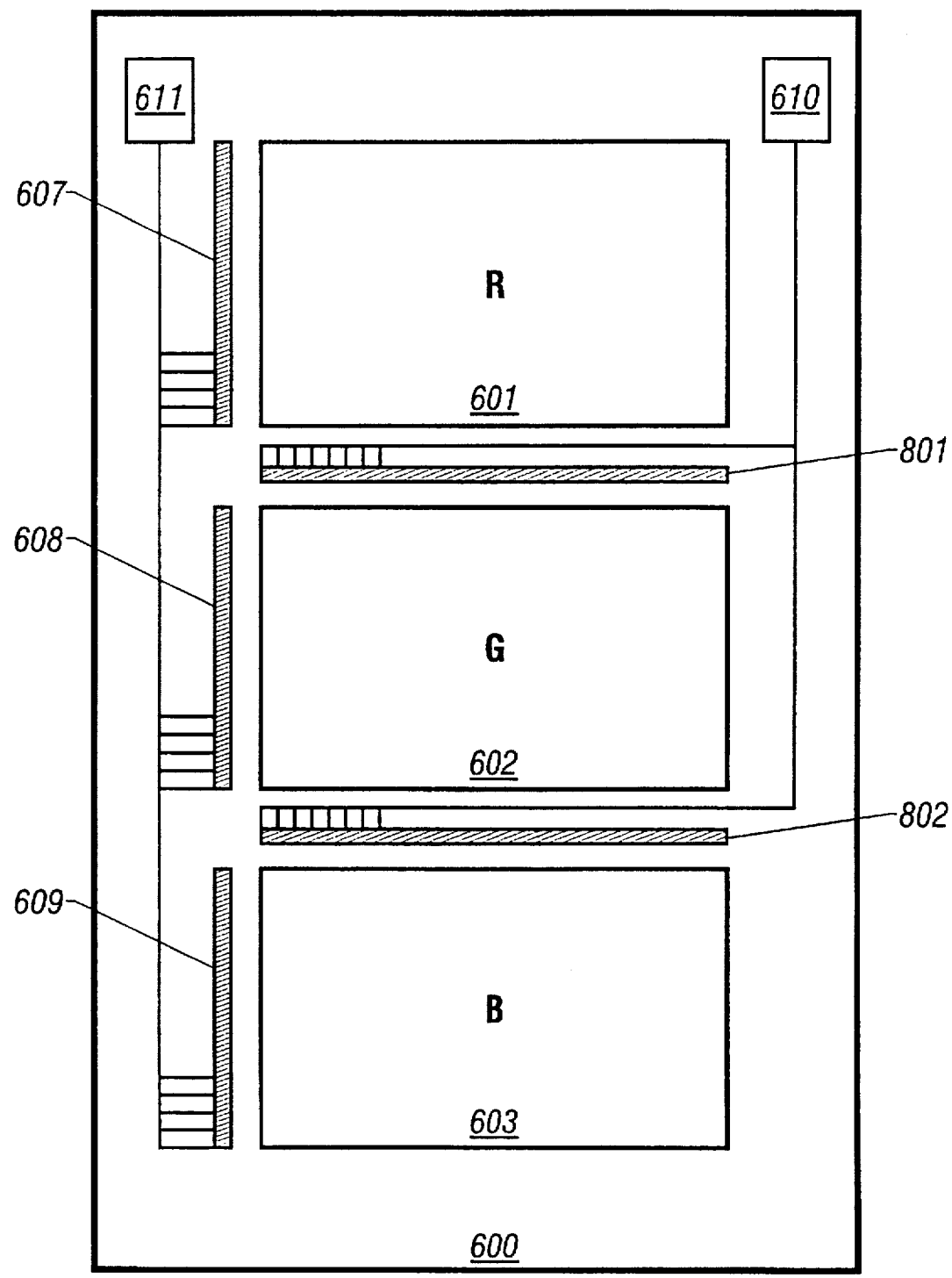
FIG. 21 is a front view showing a liquid-crystal panel in accordance with an eleventh embodiment of the present invention.
Figure 22:
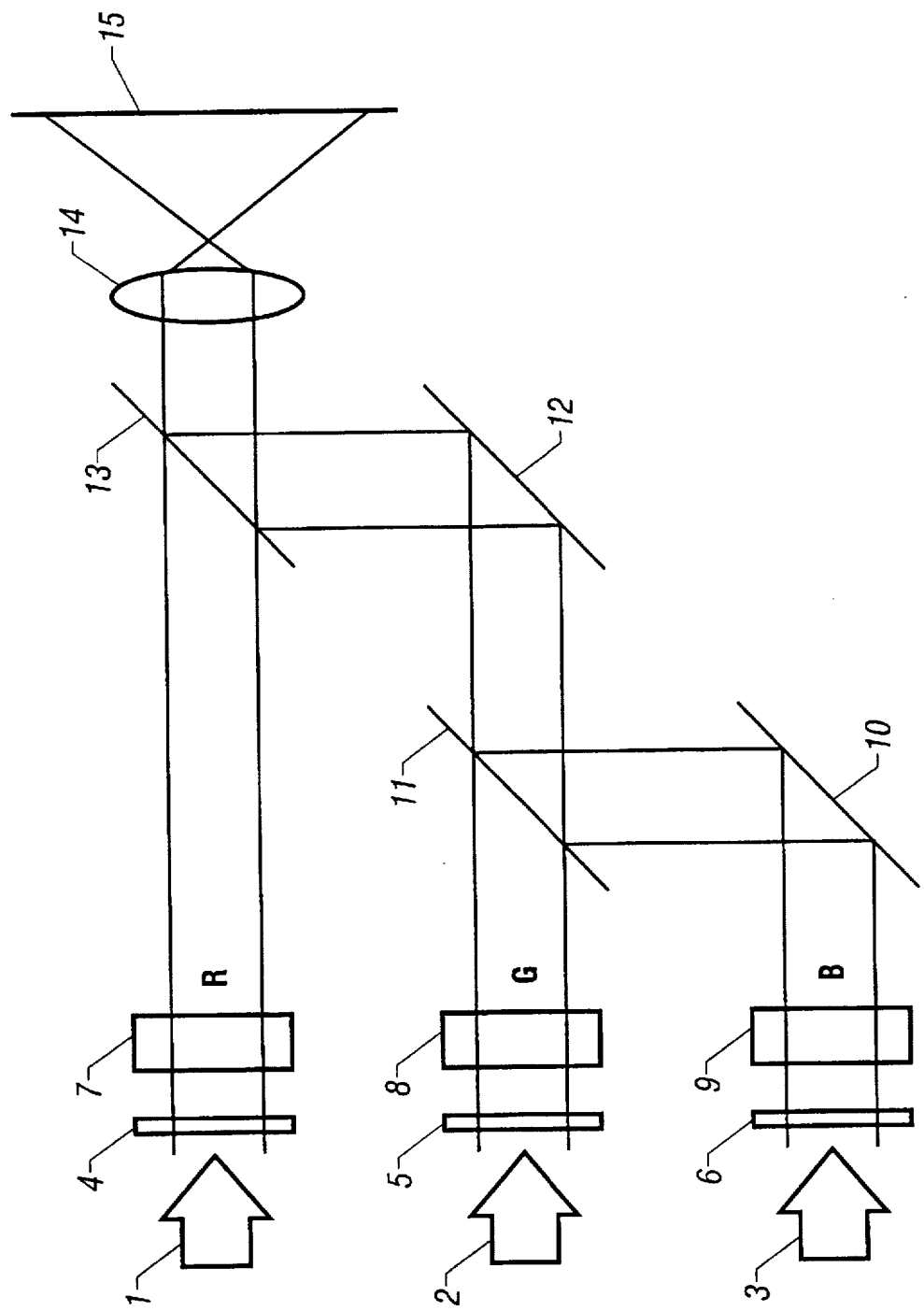
FIG. 22 is a structural diagram showing a conventional projection type liquid-crystal display unit.
Figure 23:
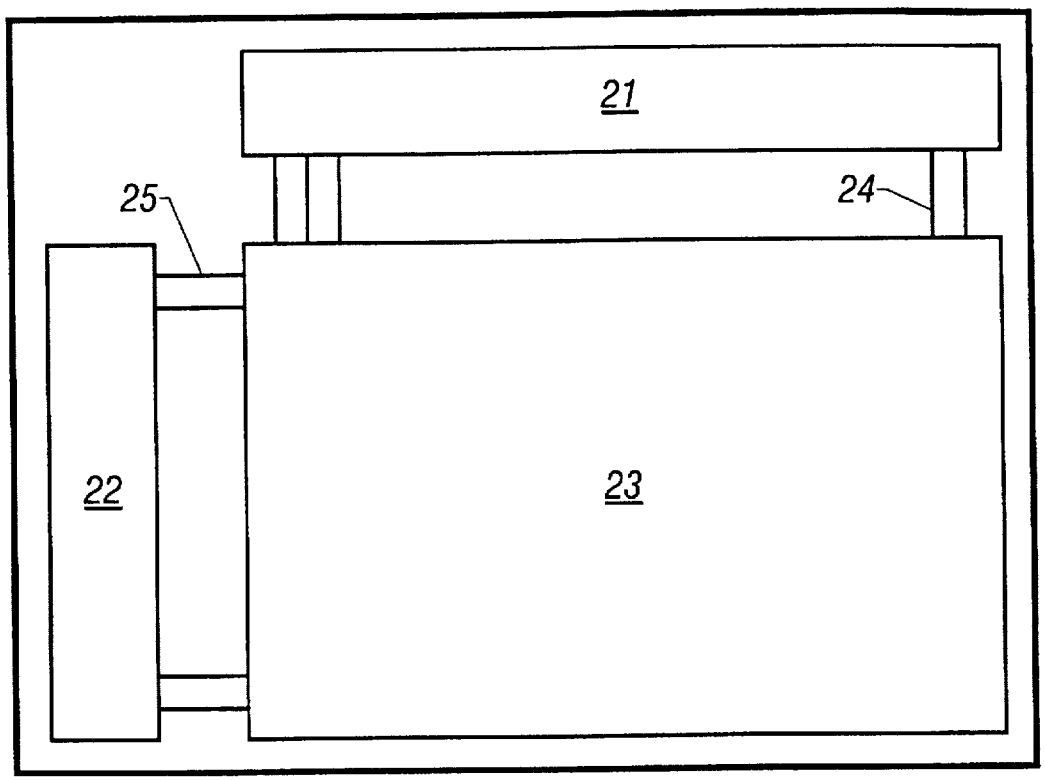
FIG. 23 is a front view showing a conventional projection type liquid-crystal display unit.
Figure 24:
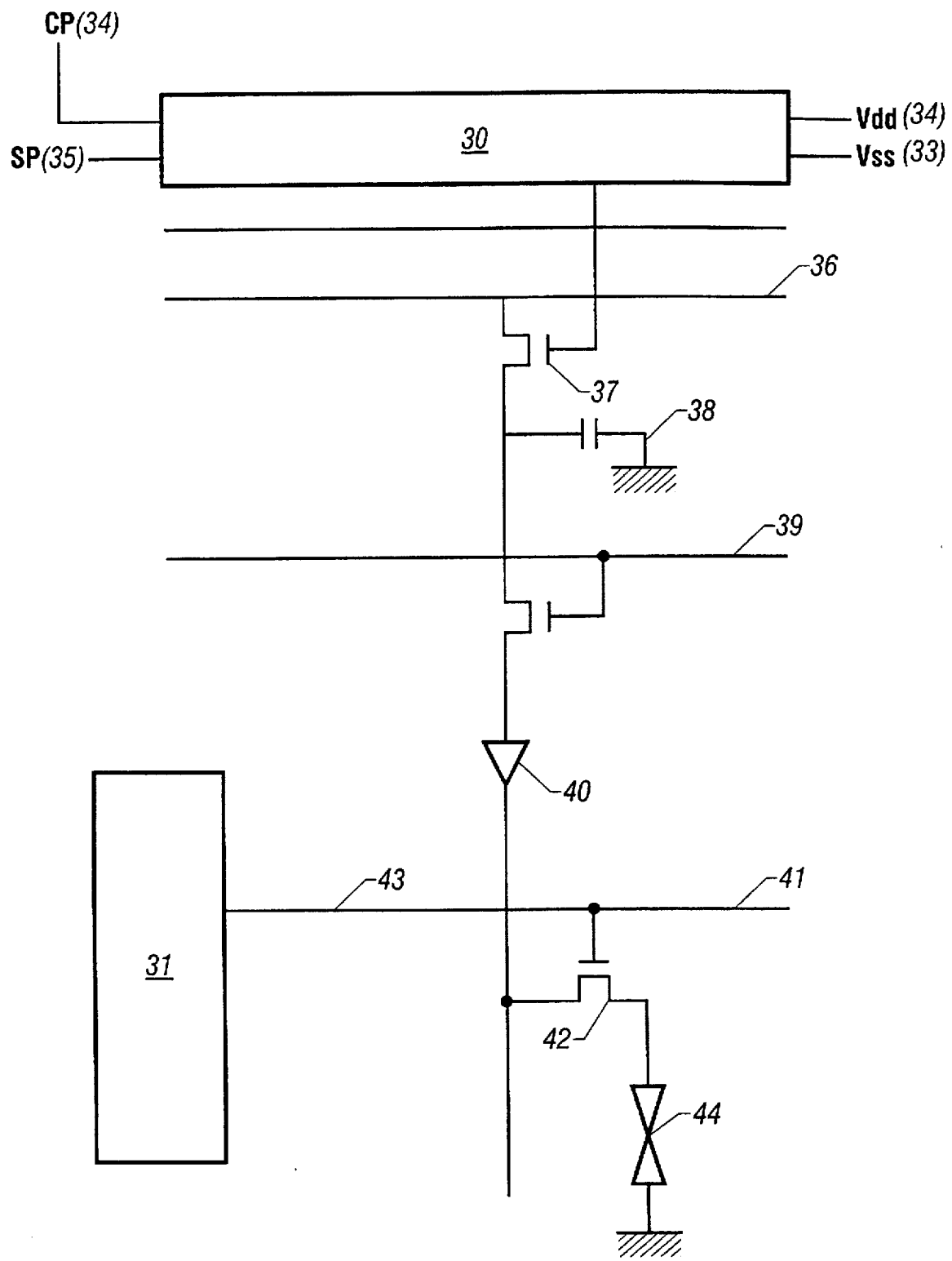
FIG. 24 is a block diagram showing a conventional analog type signal line drive circuit.
Figure 25:
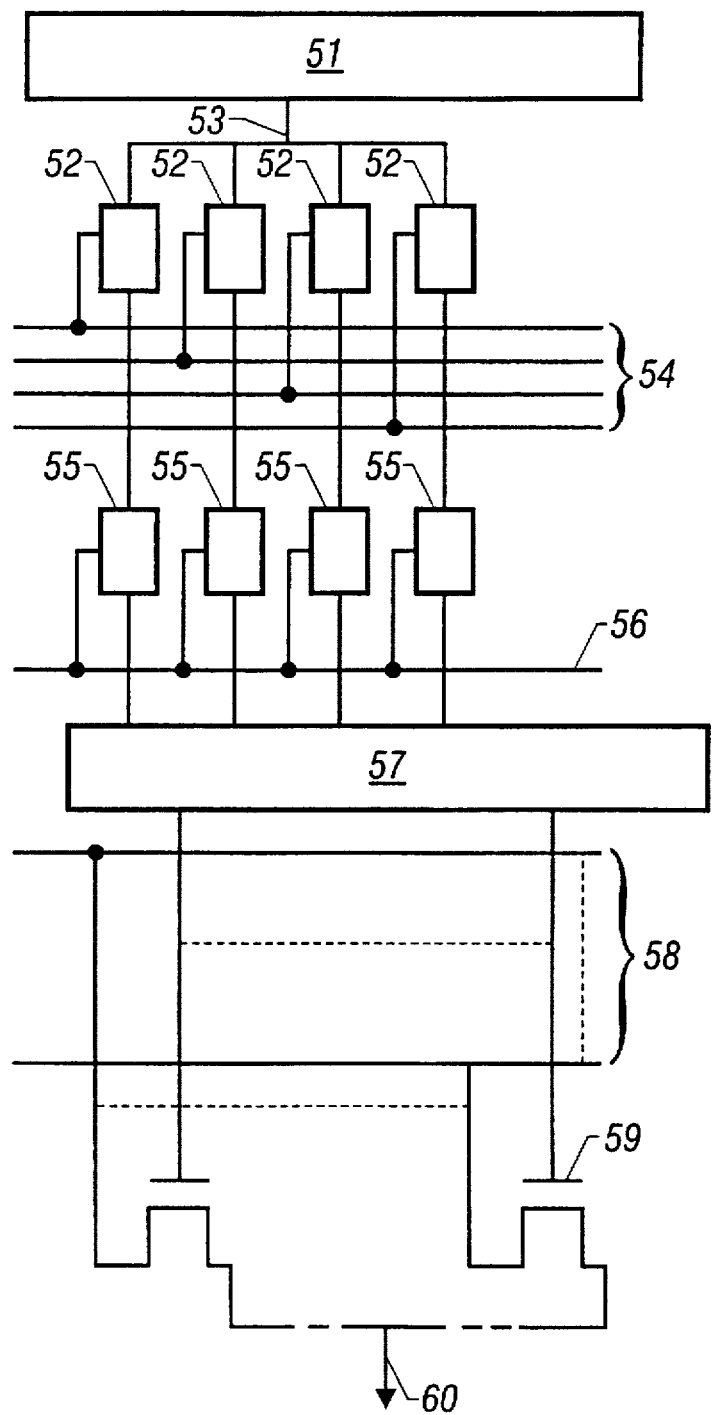
FIG. 25 is a block diagram showing a conventional digital type signal line drive circuit.
Figure 26:
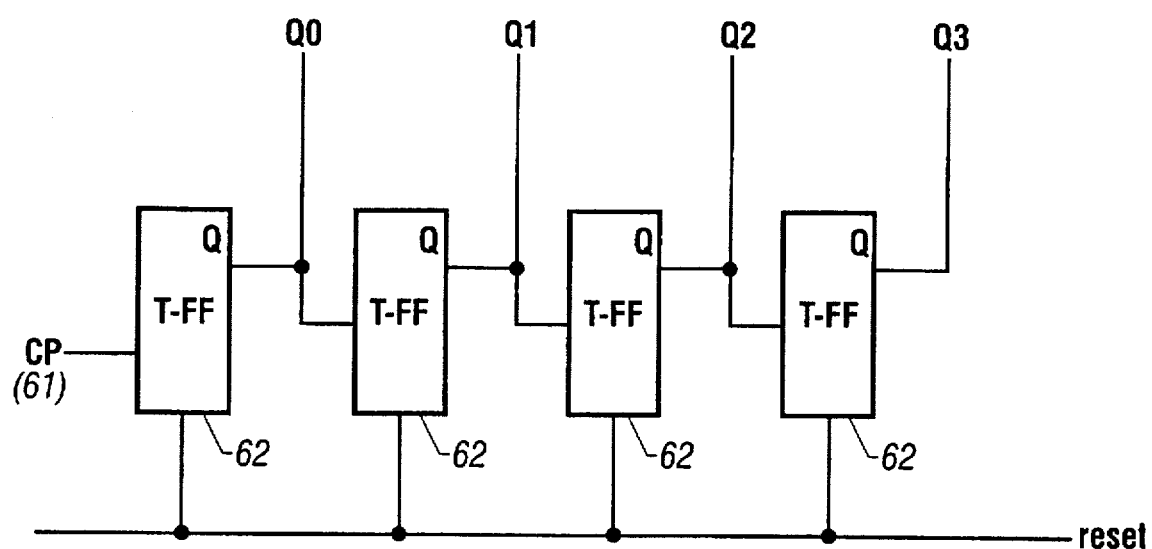
FIG. 26 is a block diagram showing a conventional asynchronous counter.
Figure 27A:
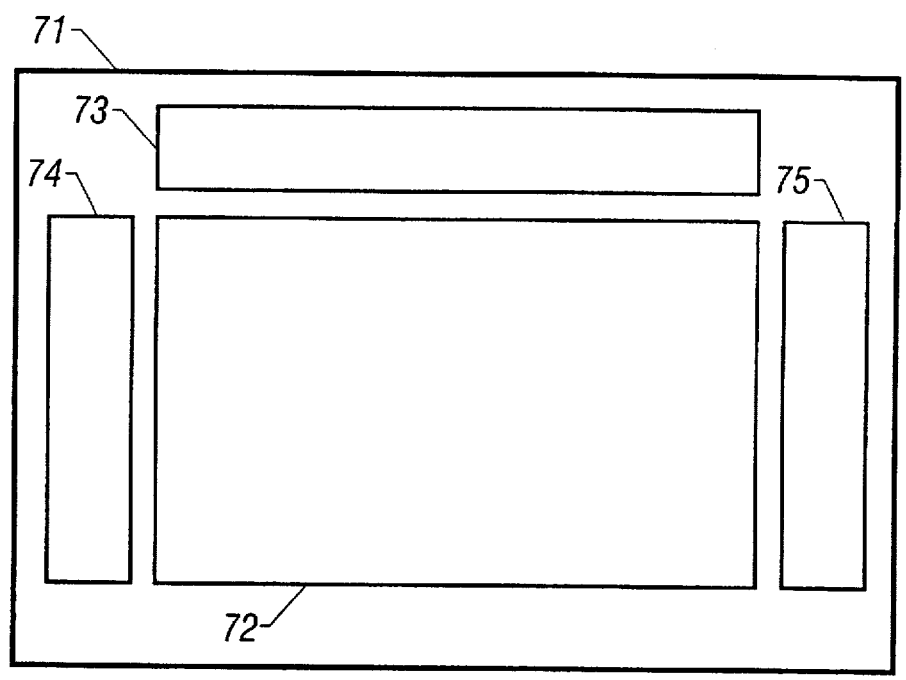
FIGS. 27(A) and 27(B) are block diagrams showing a conventional bidirectional drive type liquid-crystal display unit.
Figure 27B:
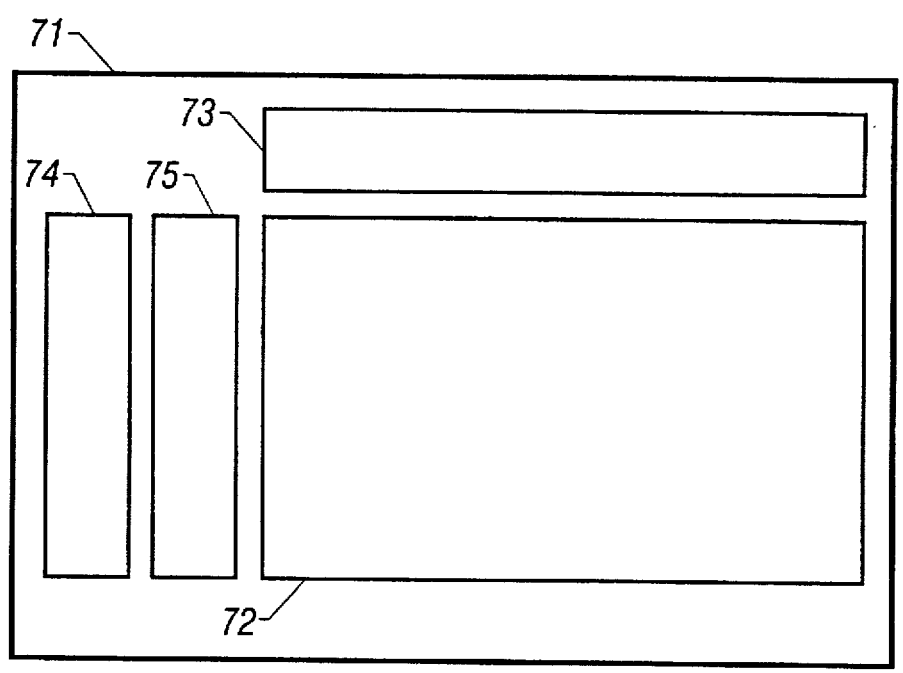

FIG. 21 shows a structural diagram of this embodiment, and the same signs as those in FIG. 13 indicates like members.

In this embodiment, in order to drive the scanning lines of three liquid-crystal panels 601 to 603 by two scanning line drive circuits 801 and 802, the scanning lines of the R liquid-crystal panel 601 and the B liquid-crystal panel 603 are driven by the scanning line drive circuits 802 and 803, respectively, and the scanning line of the G liquid-crystal panel 602 is driven by the scanning line drive circuits 801 and 802. For example, the scanning line drive circuit 801 drives the odd scanning lines of the liquid-crystal panel 602, and the scanning line drive circuit 802 drives the even scanning lines of the liquid-crystal panel 602.

As was described above, according to the present invention, the integrated liquid-crystal panels are immersed in a coolant, and the lengths of light beams that penetrate the coolant are made different from each other, whereby the focal positions of images from the respective liquid-crystal panels can be made to coincide with each other at a predetermined position.

For example, in the structure shown in FIG. 1, the focal positions of the respective images of RGB can be made to coincide with each other on the projection lens 119. With this, the image quality can be prevented from being deteriorated even though the focal point of the projection lens 119 be changed and the enlargement of an image or the size of the projection area is changed.

Also, since the entire liquid-crystal panel is cooled with a liquid, a lamp having a high luminance can be used, thereby being capable of conducting a bright image display.

Since the focal positions of the images from a plurality of optical modulation elements which have been integrated are controlled using the optical path length correction lens, the respective images can be prevented from being shifted in the case where the images from the respective optical modulation elements are synthesized.

For example, display can be conducted without any shifting of the respective images of RGB by applying the liquid-crystal panels for RGB and making the focal positions of the images from the respective liquid-crystal panels coincide with each other using the optical path length correction lens. In other words, an image without any color shifts can be displayed.

Since a plurality of optical modulation elements are integrated using the same substrate, the entire structure can be downsized and simplified.

The present invention can realize all of the following requirements.

(1) The overall structure is downsized as much as possible.

(2) The structural elements are reduced in number (The structure is simplified).

(3) The structure is so designed as to restrain the rising of temperature.

(4) The structure are so designed that the respective optical axes of RGB images readily coincide with each other.

(5) The structure is so designed that the lengths of optical paths for RGB are made uniform.

As was described above, the linear sequential scanning (selecting) drive circuit of the delay signal transmission type using a shift register can be replaced by the linear sequential scanning (selecting) drive in accordance with the present invention. For that reason, the defective circuit connected to one signal line (or scanning line) does not adversely affect the operation of the circuits downstream of that defective circuit, thereby obtaining an excellent display state. As a result, the yield of the entire display unit can be remarkably improved.

Such a problem that there is a possibility of occurrence of crosstalk due to an enlargement of the display unit in size and an increase in the number of input lines which are accompanied by an increase in the number of the external input terminals using an address decoder can be solved by taking in the synchronous counter. In comparison with a case in which an address value is directly supplied to the address decoder circuit for driving, the wiring for supplying an address signal can be reduced to one, thereby being capable of promoting the downsizing of the unit. Also, the drive circuit of the present invention may be of any one of a signal line drive circuit and a scanning line drive circuit.

The foregoing description of a preferred embodiment of the invention has been presented for the purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A display unit comprising:
    a plurality of liquid crystal panels for modulating incident light beams;
    a projection lens for projecting the light beams; and
    means for adjusting focal distances of the beams related to said projection lens;
    wherein said panels are integrated together with a pair of substrates.

2. The display unit of claim 1 wherein said adjusting means comprises a material for shortening the focal distance in accordance with a distance at which the beam passes therein.

3. The display unit of claim 1 wherein said adjusting means comprises a material for prolonging the focal distance in accordance with a distance at which the beam passes therein.

4. The display unit of claim 1 wherein said adjusting means comprises a correction lens for correcting the focal distance.

5. A display unit comprising:
    means for generating white light beams;
    a plurality of liquid crystal panels for modulating the beams into modulated color light beams, respectively;
    a projection lens for projecting the modulated color light beams, distances at which the modulated color light beams reach to said projection lens being different in accordance with paths through said liquid crystal panels; and
    a material for shortening focus distances of the beams related to said projection lens, wherein distances the modulated beams travel from their respective panels are different;
    wherein said focal positions of the respective beams which pass through said projection lens are substantially identical to each other.

6. The display unit of claim 5 wherein said panel comprises a color filter.

7. A display unit comprising:
    means for generating a plurality of color light beams;
    a plurality of liquid crystal panels for modulating the color light beams, respectively;
    a projection lens for projecting the modulated light beams, distances at which the modulated beams reach said projection lens being different;
    a cooling material for cooling at least said panels, said panel being immersed in said cooling liquid; and
    a hollow portion formed at output sides of said panels inside said cooling material, said hollow portion prolonging focal distances of the beams related to said projection lens and distances at which the beams pass being different;
    wherein said focal positions of the respective beams which pass through said projection lens are substantially identical to each other.

8. The display of claim 7 wherein said hollow porion is filled with air or inactive gas.

9. The display unit of claim 7 wherein a refractive index of inside said hollow portion is lower than that of said cooling material.

10. The display unit of claim 7 wherein said generating means is immersed in said cooling material.

11. A display unit comprising:
means for generating white light beams;
a plurality of liquid crystal panels for modulating the beams and changing the beams into color light beams, respectively;
a projection lens for projecting the modulated light beams, distances at which the modulated beams reach said projection lens being different in accordance with said panels;
a cooling material for cooling at least said panels, said panel being immersed therein; and
a hollow portion formed at output sides of said panels inside said cooling material, said hollow portion prolonging focal distances of the beams related to said projection lens and distances at which the beams therein are being different in accordance with said panels;
wherein focal positions of the respective beams which pass through said projection lens are substantially identical to each other.

12. The display unit of claim 11 wherein said panel comprises a color filter.

13. The display of claim 11 wherein said hollow porion is filled with air or inactive gas.

14. The display unit of claim 11 wherein a refractive index of inside said hollow portion is lower than that of said cooling material.

15. A display unit comprising:
means for generating a plurality of color light beams;
a plurality of liquid crystal panels for modulating the color light beams, respectively;
a projection lens for projecting the modulated light beams, distances at which the modulated beams reach to said projection lens are different in accordance with said panels; and
a correction lens provided at an output side of at least one of said panels, said correction lens correcting focal distance of the beam related to said projection lens;
wherein said focal positions of the respective beams which pass through said projection lens are substantially identical to each other; and
a cooling material immersing said panels and cooling said panels.

16. The display unit of claim 15 wherein said cooling material is translucent.

17. A display unit comprising:
means for generating white light beams;
a plurality of liquid crystal panels for modulating the beams into modulated color light beams, respectively;
a projection lens for projecting the modulated color light beams; wherein distances at which the modulated color light beams travel from their respective panels to said projection lens are different; and
a correction lens provided at an output side of at least one of said panels, said correction lens changing a focal distance of the beam related to said projection lens;
wherein said focal positions of the respective beams which pass through said projection lens are substantially identical to each other.

18. The display unit of claim 17 wherein said panel comprises a color filter.

19. The display unit of claim 17 wherein said panels are immersed in a cooling material for cooling thereof.

20. The display unit of claim 19 wherein said cooling material is translucent.

21. A projection type display unit which displays on a screen comprising:
means for generating light;
a plurality of dichroic mirrors for splitting said light into color light;
a plurality of liquid crystal panels for modulating said color light;
a plurality of reflection mirrors;
a projection lens for projecting said modulated light on the screen; and
a cooling liquid, immersing said liquid crystal panels, for preventing temperature of said liquid crystal panels from increasing beyond a specified point.

22. The display unit of claim 21 wherein said cooling liquid comprising a fluorine inactive liquid which is able to transmit said light.

23. The display unit of claim 21 wherein said cooling liquid comprises a cedar oil which is able to transmit said light.

24. The display unit of claim 21 further comprising peripheral circuits of said liquid crystal panels comprising thin film transistors.

25. The display unit of claim 21 wherein said display unit is a front projection type, wherein the screen is separated from other parts of said display unit.

26. The display unit of claim 21 wherein said display unit is a rear projection type, wherein the screen is physically in a same cabinet with other parts of said display unit.

27. A projection type display unit having a screen on which light is projected comprising:
means for generating light;
a plurality of dichroic mirrors for splitting said light into color light;
a plurality of liquid crystal panels for modulating said color light;
a plurality of reflection mirrors;
a projection lens for projecting said modulated light on the screen; and
a cooling liquid, immersing at least said dichroic mirrors, said liquid crystal panels and said reflection mirrors, for preventing temperature of a whole of said display unit from increasing beyond a certain point.

28. The display unit of claim 27 wherein said cooling liquid comprises a fluorine inactive liquid which is able to transmit said light.

29. The display unit of claim 27 wherein said cooling liquid comprises a cedar oil which is able to transmit said light.

30. The display unit of claim 27 further comprising peripheral circuits of said liquid crystal panels comprises thin film transistors.

31. The display unit of claim 27 wherein said display is a front projection type, wherein the screen is separated from the other parts of said display unit.

32. The display unit of claim 27 wherein said display is a rear projection type, wherein the screen is put into a same cabinet with the other parts of said display unit.

33. The display unit of claim 27, further comprising:
a hollow portion formed at output sides of said liquid crystal panels inside said cooling liquid, said hollow portion located to change a focal distance of light;
wherein a length at which said modulated light pass into said hollow portion being different in accordance with paths to said liquid crystal panels.

34. A projection type display unit projecting information on a screen comprising:

means for generating a plurality of colored light parts;

a plurality of liquid crystal panels for modulating said colored light parts;

a plurality of reflection mirrors; and a projection lens for projecting said modulated light on a screen;

a cooling liquid, immersing said liquid crystal panels, and preventing temperature of said liquid crystal panels from increasing beyond a certain point.

35. The display unit of claim 34 wherein said cooling liquid comprises a fluorine inactive liquid which is able to transmit said light.

36. The display unit of claim 34 wherein said cooling liquid comprises a cedar oil which is able to transmit said light.

37. The display unit of claim 34 further comprising peripheral circuits of said liquid crystal panels comprises thin film transistors.

38. The display unit of claim 34 wherein said display is a front projection type, wherein the screen is separated from the other parts of said display unit.

39. The display unit of claim 34 wherein said display is a rear projection type, wherein the screen is put into a same cabinet with the other parts of said display unit.

40. A projection type display unit projecting information on a screen comprising:

means for generating a plurality of colored light parts;

a plurality of liquid crystal panels modulating said colored light parts;

a plurality of reflection mirrors;

a projection lens for projecting said modulated light on a screen; and a cooling liquid, immersing at least said liquid crystal panels and said reflection mirrors for preventing temperature of whole of said display unit from increasing beyond a certain point.

41. The display unit of claim 40 wherein said cooling liquid comprises a fluorine inactive liquid which is able to transmit said light.

42. The display unit of claim 40 wherein said cooling liquid comprises a cedar oil which is able to transmit said light.

43. The display unit of claim 40 further comprising peripheral circuits of said liquid crystal panels comprises thin film transistors.

44. The display unit of claim 40 wherein said display is a front projection type, wherein the screen is separated from the other parts of said display unit.

45. The display unit of claim 40 wherein said display unit is a rear projection type, wherein the screen is put into a same cabinet with the other parts of said display unit.

46. The display unit of claim 40, further comprising:

a hollow potion formed at output sides of said liquid crystal panels inside said cooling liquid, said hollow portion located to change focal distances of light;

wherein a length at which said modulated light pass into said hollow portion being different in accordance with said panels.

47. A projection type display unit displaying on a screen comprising:

means for generating light;

a plurality of liquid crystal panels for modulating said light into modulated color light, respectively;

a plurality of reflection mirrors, reflecting said modulated color light;

a projection lens for projecting said modulated light on the light screen; and a cooling liquid for preventing a temperature of said liquid crystal panels from increasing beyond a certain point.

48. The display unit of claim 47 wherein said cooling liquid comprises a fluorine inactive liquid which is able to transmit said light.

49. The display unit of claim 47 wherein said cooling liquid comprises a cedar oil which is able to transmit said light.

50. The display unit of claim 47 wherein said liquid crystal panels are integrated together with a pair of substrates.

51. The display unit of claim 47 further comprising peripheral circuits of said liquid crystal panels comprising thin film transistors.

52. The display unit of claim 47 wherein said display is a front projection type, wherein the screen is separated from the other parts of said display unit.

53. The display unit of claim 47 wherein said display is a rear projection type, wherein the screen is put into a same cabinet with the other parts of said display unit.

54. A projection type display unit display comprising:

means for generating light;

a plurality of liquid crystal panels for modulating said light into modulated color light, respectively;

a plurality of reflection mirrors, reflecting said modulated color light;

a projection lens for projecting said modulated light on the screen; and a cooling liquid, immersing at least said liquid crystal panels and reflection mirrors for preventing temperature of a whole of said display unit from increasing beyond a certain point.

55. The display unit of claim 54 wherein said cooling liquid comprises a fluorine inactive liquid and is able to transmit said light.

56. The display unit of claim 54 wherein said cooling liquid comprises a cedar oil and is able to transmit said light.

57. The display unit of claim 54 further comprising peripheral circuits of said liquid crystal panels which comprises thin film transistors.

58. The display unit of claim 54 wherein said unit is a front projection type, wherein the screen is separated from the other parts of said display unit.

59. The display unit of claim 54 wherein said unit is a rear projection type, wherein the screen is put into a same cabinet with the other parts of said display unit.

60. The display unit of claim 54, further comprising:

a hollow portion formed at output sides of said liquid crystal panels inside said cooling liquid, said hollow portion changes focal distances;

wherein length at which said modulated light pass into said hollow portion being different in accordance with said panels.

61. A projector comprising:

a light source;

a liquid crystal device for modulating light from said light source;

a first optical system directing the light from said light toward said liquid crystal device;

a second optical system directing the light modulated by the liquid crystal toward a screen; and a cooling liquid medium cooling at least said liquid crystal device, wherein said cooling medium covers an entirety of said liquid crystal device.

62. A projector according to claim 61, wherein said cooling liquid medium also covers said first optical system.

63. A projection type display unit, comprising:

a light generator;

a plurality of liquid crystal panels, operating to modulate light from said light generator into color light, each said liquid crystal panels modulating a different spectral portion of said light;

a projection lens, receiving said light from said liquid crystal panels and projecting said light on a screen; and a cooling liquid, immersing at least one part of said display unit, and cooling said at least one part.

64. A unit as in claim 63 wherein said cooling liquid also adjusts a focal distance of the light passing therethrough.

65. A unit as in claim 63 wherein said liquid crystal units are disposed at different locations so that light passing therethrough travels over different paths, and wherein paths of said light through said cooling material is different in order to adjust said focal distances of the beams so that all focal distances of beams arriving at said lens are substantially the same.

* * * * *